US010605460B2

United States Patent
Moon et al.

(10) Patent No.: US 10,605,460 B2
(45) Date of Patent: Mar. 31, 2020

(54) COOKING APPARATUS

(71) Applicant: Samsung Electronics Co., Ltd., Gyeonggi-do (KR)

(72) Inventors: Seong Cheol Moon, Gyeonggi-do (KR); Boo Keun Yoon, Gyeonggi-do (KR); Tetsuji Kitashima, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 15/085,793

(22) Filed: Mar. 30, 2016

(65) Prior Publication Data

US 2016/0290655 A1 Oct. 6, 2016

(30) Foreign Application Priority Data

Mar. 30, 2015 (KR) .................. 10-2015-0044446
Apr. 7, 2015 (KR) .................. 10-2015-0049000

(51) Int. Cl.
*F24C 1/02* (2006.01)
*A47J 27/62* (2006.01)
(Continued)

(52) U.S. Cl.
CPC ............... *F24C 1/02* (2013.01); *A47J 27/62* (2013.01); *F24C 3/126* (2013.01); *F24C 7/083* (2013.01); *F24C 11/00* (2013.01)

(58) Field of Classification Search
CPC ... A47J 27/62; F24C 11/00; F24C 1/02; F24C 3/126; F24C 7/083; F24C 3/00
(Continued)

(56) References Cited

U.S. PATENT DOCUMENTS 6,322,354 B1 * 11/2001 Carbone ............... F23D 14/02
126/39 E
8,008,605 B2 * 8/2011 Shukla ............... H05B 1/0266
219/497
(Continued)

FOREIGN PATENT DOCUMENTS

WO   WO 2015196240   * 12/2015

*Primary Examiner* — Dana Ross
*Assistant Examiner* — Joseph W Iskra

(57) ABSTRACT

Provided is a cooking apparatus including a first heating unit that has a first hole and generates heat using a first heat source, a second heating unit that is arranged to be stacked on the first heating unit, has a second hole formed at a position corresponding to the first hole, and generates heat using a second heat source, and a temperature detection unit that is arranged to protrude to the outside of the second hole while being arranged in the first hole of the first heating unit and the second hole of the second heating unit, and detects a temperature of a cooking vessel when the cooking vessel is brought into contact with the temperature detection unit. The output of each of the first heating unit and the second heating unit is controlled at levels of multiple stages by detecting a temperature of a lower portion of the cooking vessel, and food is cooked at an optimum temperature, thereby improving the taste of the food resulting in improved user satisfaction. The first heating unit and the second heating unit is operated together, so that it is possible to prevent emission of the heat of the second heating unit to the outside by the heat generated by the first heating unit, thereby reducing energy consumed in the second heating unit while increasing the heating rate.

10 Claims, 22 Drawing Sheets

(51) Int. Cl.
*F24C 11/00* (2006.01)
*F24C 7/08* (2006.01)
*F24C 3/12* (2006.01)

(58) Field of Classification Search
USPC .. 219/452.11, 452.12, 458, 467.1, 491, 493; 392/306–310; 126/39 E, 39 N, 19 R, 126/214 R
See application file for complete search history.

(56) References Cited

U.S. PATENT DOCUMENTS

| | | | | |
|---|---|---|---|---|
| 2002/0088792 | A1* | 7/2002 | Bates | H05B 3/746 219/448.11 |
| 2008/0108388 | A1* | 5/2008 | Ebrom | D06F 39/005 455/557 |
| 2017/0138603 | A1* | 5/2017 | Larsen | F24C 1/02 |
| 2017/0142780 | A1* | 5/2017 | Hoare | H05B 6/062 |

* cited by examiner

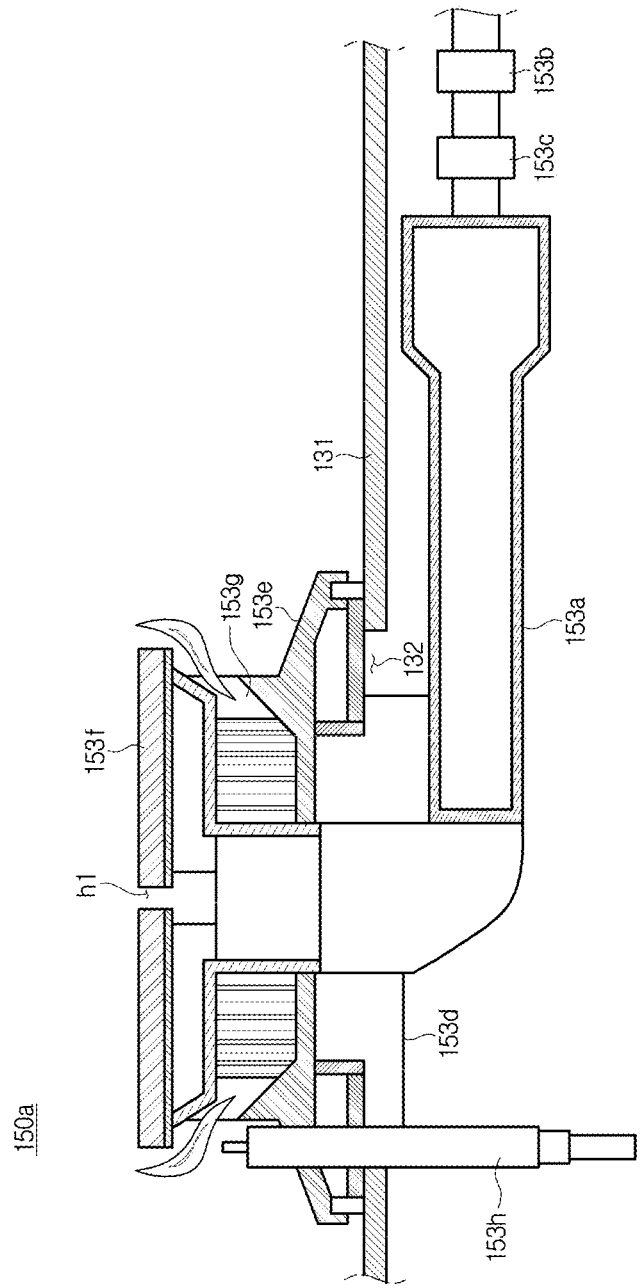

FIG. 13

OUTPUT LEVEL

| SECOND HEATING UNIT \ FIRST HEATING UNIT | OFF | LOW | HIGH |
|---|---|---|---|
| OFF |  | 2 | 3 |
| MIN | 1 | 4 | 7 |
| MID |  | 5 | 8 |
| MAX |  | 6 | 9 |

…

COOKING APPARATUS

CROSS-REFERENCE TO RELATED APPLICATIONS AND CLAIM OF PRIORITY

This application claims the benefit of Korean Patent Application Nos. 10-2015-0044446 and 10-2015-0049000, filed on Mar. 30, 2015 and Apr. 7, 2015, respectively in the Korean Intellectual Property Office, the disclosure of which is incorporated herein by reference.

FIELD

Embodiments of the present disclosure relate to a cooking apparatus for adjusting output.

BACKGROUND

In general, a cooking apparatus is an apparatus that heats and cooks food, and roughly classified into an apparatus using a method of generating heat for heating food using electricity and an apparatus using a method of generating heat for heating food by burning gas.

Such a cooking apparatus may be divided into a gas range, an oven, and an electric range, and the like.

To maintain a specific temperature while cooking food using such a cooking apparatus is an important factor in determining the taste of the food.

For example, when the temperature of heat for cooking food is too low or high, the food is likely to be undercooked or burnt.

In addition, when the temperature of heat for cooking food is not appropriately adjusted, food and liquid may spill out of a cooking vessel or oil for frying may be scattered.

Because of this, it is important to adjust the temperature of the food in cooking using the cooking apparatus.

In particular, when a frying temperature is adjusted or when soup or the like is heated to an appropriate temperature and kept warm, temperature adjustment is more important.

In a case of a gas range, the heating power may be adjusted in multiple stages by adjusting the heating power to maximum/off or maximum/minimum/off, or continuously adjusting the amount of gas using a stepping motor.

However, when adjusting the heating power of the gas range to maximum/off or maximum/minimum/off, adjustment of the heating power is not easy due to the small number of adjustment stages.

In addition, when adjusting the heating power of the gas range using the stepping motor, the manufacturing costs of the gas range is increased.

SUMMARY

Therefore, it is an aspect of the present disclosure to provide a hybrid type-cooking apparatus that may include a first heating unit that generates heat using gas and a second heating unit that generates heat for reinforcing output of the first heating unit while generating heat using electricity, and further include a temperature detection unit that detects a temperature of a cooking vessel when the heat generated from the first heating unit and the second heating unit is transmitted to the cooking vessel.

It is another aspect of the present disclosure to provide a cooking apparatus that may set an output level of multiple stages by combining a first heating level of a first heating unit and a second heating level of a second heating unit, and control the output of the first heating unit and the second heating unit so as to obtain an output level corresponding to cooking information.

Additional aspects of the disclosure will be set forth in part in the description which follows and, in part, will be obvious from the description, or may be learned by practice of the disclosure.

In accordance with one aspect of the present disclosure, a cooking apparatus includes: a first heating unit that has a first hole and generates heat using a first heat source; a second heating unit that is arranged to be stacked on the first heating unit, has a second hole formed at a position corresponding to the first hole, and generates heat using a second heat source; and a temperature detection unit that is arranged to protrude to the outside of the second hole while being arranged in the first hole of the first heating unit and the second hole of the second heating unit, and detects a temperature of a cooking vessel when the cooking vessel is brought into contact with the temperature detection unit.

Here, the second heating unit may be arranged to be spaced apart from the first heating unit.

The temperature detection unit may include a sensing portion that protrudes to the outside of the second hole and detects the temperature of the cooking vessel, a guidance portion that is connected to the sensing portion, receives a signal line of the sensing portion, and is movably arranged inside the first hole and the second hole, and an elastic member that elastically supports the guidance portion, and wherein a size of the sensing portion may be smaller than a size of the second hole.

The guidance portion may further receive a communication line and a power line of the second heating unit.

The sensing portion has a size smaller than a size of the second hole.

The second heating unit may include a heat generation unit that generates heat using electrical energy, a housing that receives the heat generation unit, and an insulation portion that is arranged adjacent to the housing, and prevents emission of heat generated by the heat generation unit.

The second heating unit may include a heat generation unit that generates heat using electrical energy, a housing that receives the heat generation unit, an insulation portion that is arranged between the first heating unit and a lower surface of the housing and prevents emission of heat generated by the heat generation unit, and a panel that is arranged adjacent to an upper surface of the housing, wherein the insulation portion, the housing, and the panel may be arranged to be stacked on top of one another and respectively have the second hole.

The temperature detection unit may be moved to the same position as that of an upper surface of the panel while being moved to the inside of the second hole of the panel, when the temperature detection unit is pressurized by the cooking vessel.

The second heating unit may further include a fixing member that is arranged between the housing and the panel and connects the housing and the panel.

The second heating unit may further include a fixing member that is arranged between the housing and the panel and elastically supports the panel.

The cooking apparatus may further include a storage unit that stores output levels of multiple stages which are set by a combination of a heating level of the first heating unit and a heating level of the second heating unit; an input unit that receives one output level of the output levels of multiple stages; and a control unit that controls the heating level of at least one of the first heating unit and the second heating unit based on the received output level.

The cooking apparatus may further include a communication unit that performs communication with an external device, wherein the control unit may control the communication unit so that operation information of each of the first heating unit and the second heating unit is transmitted to the external device, The cooking apparatus may further include a communication unit that performs communication with an external device, wherein the control unit may control each of the heating level of the first heating unit and the heating level of the second heating unit based on cooking information received by the communication unit.

The cooking apparatus may further include a communication unit that performs communication with an external device; and a control unit that controls the communication unit so that the detected temperature is transmitted to the external device.

The cooking apparatus may further include a control unit that controls output of alarm information when the detected temperature is a limit temperature or higher; and a display unit that outputs the alarm information.

The cooking apparatus may further include a support that supports the cooking vessel, wherein a height of the stacked first and second heating units may be the same as or higher than a height of the support. Alternatively, a height of the support may be higher than the height of the stacked first and second heating units.

The cooking apparatus may further include a control unit that determines a cooking time during operation of at least one of the first heating unit and the second heating unit, and controls output of alarm information when the determined cooking time passes a limit time.

In accordance with one aspect of the present disclosure, a cooking apparatus includes: a first heating unit that has a first hole, and generates heat using a first heat source; a second heating unit that is arranged to be stacked on the first heating unit, has a second hole formed in a position corresponding to the first hole, and generates heat for reinforcing heat generated by the first heating unit while generating heat using a second heat source; a temperature detection unit that is arranged to protrude to the outside of the second hole while being arranged in the first hole of the first heating unit and the second hole of the second heating unit, and detects a temperature of a cooking vessel when the cooking vessel is brought into contact with the temperature detection unit; an input unit that receives an operation command of the first heating unit; and a control unit that controls an operation of the second heating unit when the operation command of the first heating unit is received.

Here, the temperature detection unit may include a sensing portion that protrudes to the outside of the second hole and detects the temperature of the cooking vessel, a guidance portion that is connected to the sensing portion, receives a signal line of the sensing portion and a communication line and a power line of the second heating unit, and is movably arranged inside the first hole and the second hole, and an elastic member that elastically supports the guidance portion.

The second heating unit may include a heat generation unit that generates heat using electrical energy, a housing that receives the heat generation unit, an insulation portion that is arranged between the first heating unit and a lower surface of the housing and prevents emission of heat generated by the heat generation unit, and a panel that is arranged adjacent to an upper surface of the housing, and wherein the insulation portion, the housing, and the panel may be arranged to be stacked on top of one another and respectively have the second hole.

The cooking apparatus may further include a display unit that displays the temperature of the cooking vessel.

When a menu is input to the input unit, the control unit may control one of an output level, a cooking time, and energy consumption each corresponding to the input menu to be output as recommendation information.

The control unit may adjust the heating level of the second heating unit when constant temperature control is required during cooking.

In accordance with one aspect of the present disclosure, a cooking apparatus includes: a first heating unit generating heat using a first heat source; a and a second heating unit arranged to be spaced apart from the first heating unit to form an air flow path between the first heating unit and the second heating unit and generating heat using a second heat source.

The cooking apparatus further includes: a storage unit storing output levels of multiple stages that are set by a combination of a heating level of a first heating unit and a heating level of a second heating unit; an input unit that receives one output level of the output levels of multiple stages; and a control unit that controls the heating level of at least one of the first heating unit and the second heating unit based on the received output level.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 illustrates a first heating unit of a range assembly provided in a cooking apparatus in accordance with one embodiment of the present disclosure;

FIG. 13 illustrates an output level of a range assembly provided in a cooking apparatus in accordance with one embodiment of the present disclosure;

DETAILED DESCRIPTION

Hereinafter, the present disclosure will be described in detail with reference to the accompanying drawings.

Figure 1:
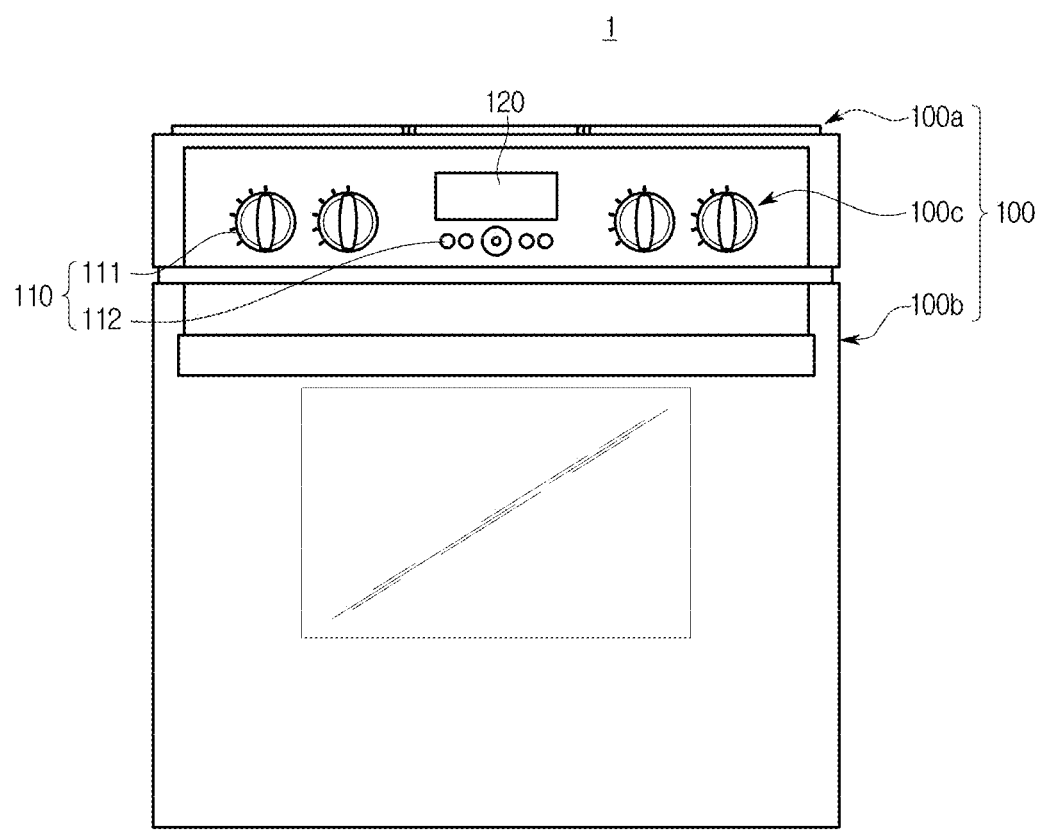
FIG. 1 illustrates a cooking apparatus in accordance with one embodiment of the present disclosure.

FIG. 1 illustrates a cooking apparatus in accordance with one embodiment of the present disclosure.

A cooking apparatus 1 includes a main body 100 forming an exterior thereof.

The main body 100 includes a first cooking unit 100a positioned in an upper space of an inner space and a second cooking unit 100b positioned in a lower space thereof.

In addition, the main body 100 of the cooking apparatus 1 may include only the first cooking unit 100a of the first cooking unit 100a and the second cooking unit 100b.

Here, the first cooking unit 100a is arranged in such a manner that a cooking vessel is placed thereon while being provided to be exposed to the outside of the main body, and generates heat to the cooking vessel side so that food within the cooking vessel can be cooked.

The second cooking unit 100b includes a cooking space and further includes a door that opens and closes the cooking space, and generates heat and transmits the generated heat to the cooking space so that food sealed in the cooking space is cooked by dry heat when food is received in the cooking space and then the cooking space is sealed.

Such a first cooking unit 100a may be a range and the second cooking unit 100b may be an oven.

The main body 100 of the cooking apparatus includes a user interface 100c that inputs and outputs cooking information of the first cooking unit 100a and the second cooking unit 100b.

The user interface 100c includes an input unit 110 that inputs the cooking information and a display unit 120 that displays the cooking information.

The input unit 110 includes a first input unit 111 that receives an output level of the first cooking unit 100a and a second input unit 112 that receives cooking information of the first cooking unit 100a and the second cooking unit 100b.

Here, the first input unit 111 may be provided in the form of a jog dial, a physical button, or a touch button, and the second input unit 112 may be provided in the form of at least one of a physical button, a touch button, and a jog dial.

The display unit 120 displays information input to the input unit 110, and displays cooking information during operations of the first cooking unit 100a and the second cooking unit 100b.

Such a display unit 120 may be provided in the form of a flat panel display such as an LCD, PDP, or OLED.

Figure 2A:
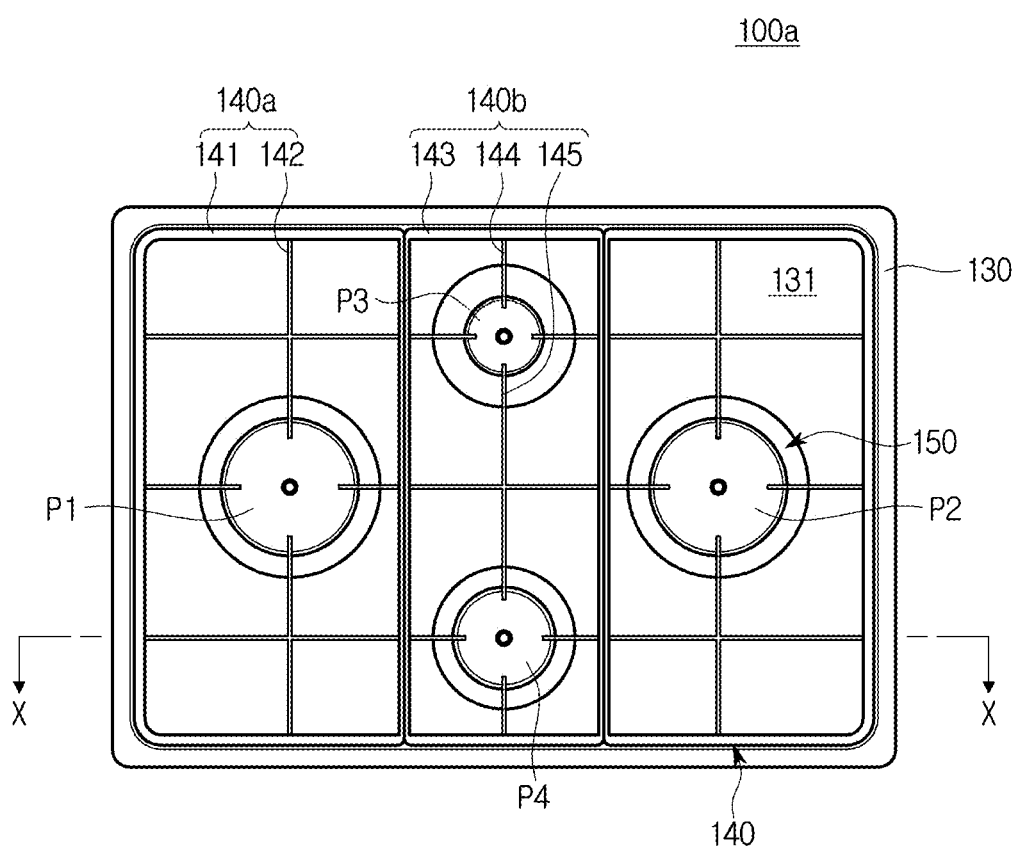
FIG. 2A illustrates a first cooking unit 100a provided in a cooking apparatus in accordance with one embodiment of the present disclosure.
Figure 2B:
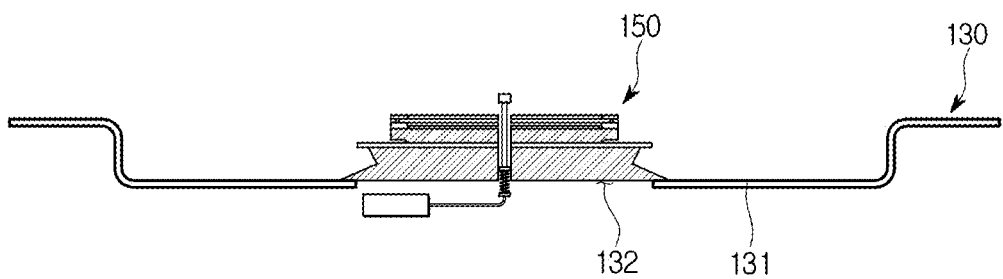
FIG. 2B illustrates a cross sectional view of the first cooking unit taken along a line X-X shown in FIG. 2A.

FIG. 2A illustrates a first cooking unit 100a provided in a cooking apparatus in accordance with one embodiment of the present disclosure, and FIG. 2B illustrates a cross sectional view of the first cooking unit taken along a line X-X shown in FIG. 2A.

As illustrated in FIG. 2A, the first cooking unit 100a includes a plate 130 that covers an upper portion of the main body 100, a support 140 that is detachably positioned at an upper side of the plate 130 and supports the cooking vessel, and a range assembly 150 that is arranged in the plate 130 and generates heat.

Here, a plurality of range assemblies 150 (P1, P2, P3, and P4) may be provided, and maximum output levels of the plurality of range assemblies may be the same or different from each other.

As illustrated in FIG. 2B, the plate 130 includes a recessed portion 131 and an opening 132 formed in the recessed portion 131.

The support 140 may be detachably arranged in the recessed portion 131.

Here, the number of the openings 132 of the plate 130 and the number of the range assemblies 150 may be the same, and one or a plurality of openings 132 and range assemblies 150 may be provided.

In addition, the range assembly 150 is arranged at the opening 132 of the plate 130. Such a range assembly 150 may be detachably coupled to the recessed portion 131.

Here, the recessed portion 131 of the plate 130 may receive food and liquid that spill out of the cooking vessel and prevent the liquid of the food from flowing to the outside.

The support 140 may be paired with one range assembly 150, and may be an individual support 140a that is positioned around the range assembly 150 paired with the support 140 and supports the cooking vessel positioned in the range assembly 150 paired with the support 140.

The individual support 140a includes a frame 141 that is brought into contact with the plate 130 and at least three support legs 142 that protrude from the frame 141 and support the cooking vessel.

The at least three support legs 142 have the same height while having a predetermined height. The at least three support legs 142 may allow the cooking vessel to be placed at a predetermined distance from the range assembly 150.

The support 140 may be paired with at least two range assemblies 150, and may be a connection type support 140b that supports each of the cooking vessels positioned in the at least two range assemblies 150 paired with the support 140.

The connection type support 140b includes a frame 143 that has a size enough to receive the at least two range assemblies, and a plurality of support legs 144 that respectively protrude from the frame 143 to sides of the at least two range assemblies.

The plurality of support legs may include a common support leg 145 in which at least two support legs are mutually connected among the support legs heading toward the range assemblies different from each other.

When a plurality of range assemblies 150 are provided, the support 140 may be provided individually for each of the range assemblies 150 or provided so as to be all connectable, or only some of the support 140 may be connectable.

The outer shapes and sizes of the frames 141 and 143 of the support 140 respectively correspond to the outer shape and size of the recessed portion formed in the plate 130. Accordingly, the support 140 may be fixedly arranged in the recessed portion 131 of the plate 130.

Figure 3A:
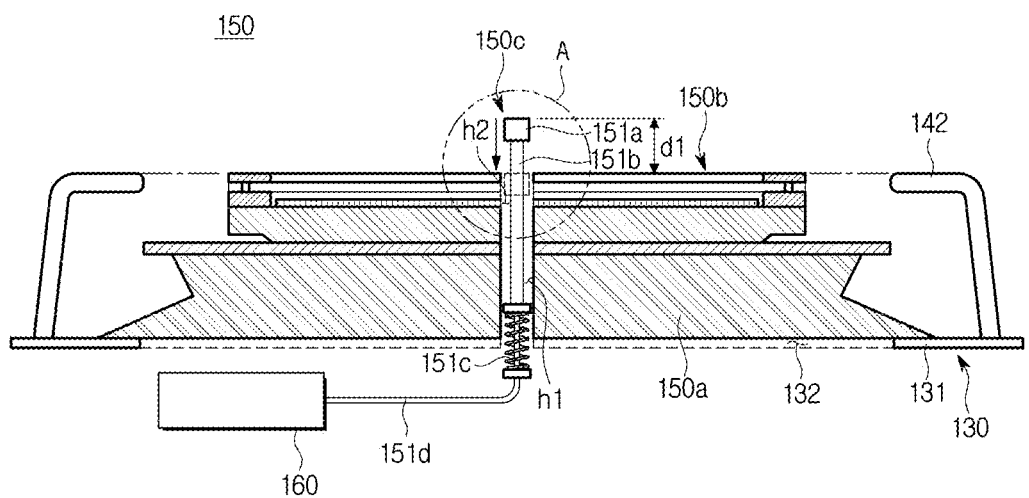
FIG. 3A illustrates a range assembly of a first cooking unit provided in a cooking apparatus in accordance with one embodiment of the present disclosure.
Figure 3B:
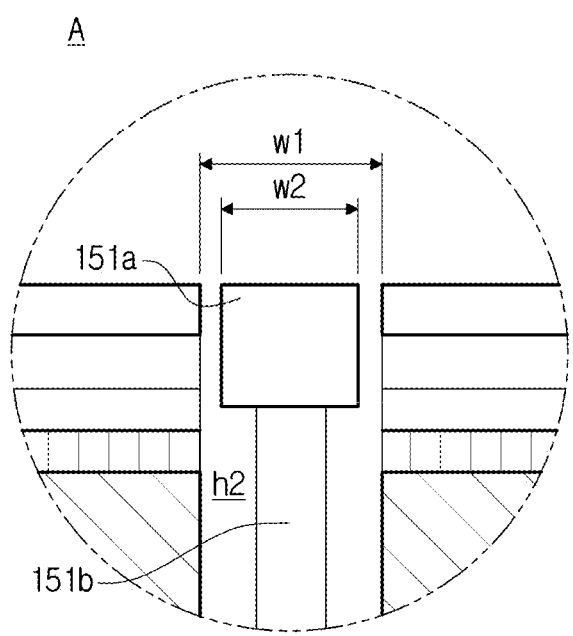
FIG. 3B is a detailed configuration view showing a temperature detection unit provided in the range assembly shown in FIG. 3A.
Figure 3C:
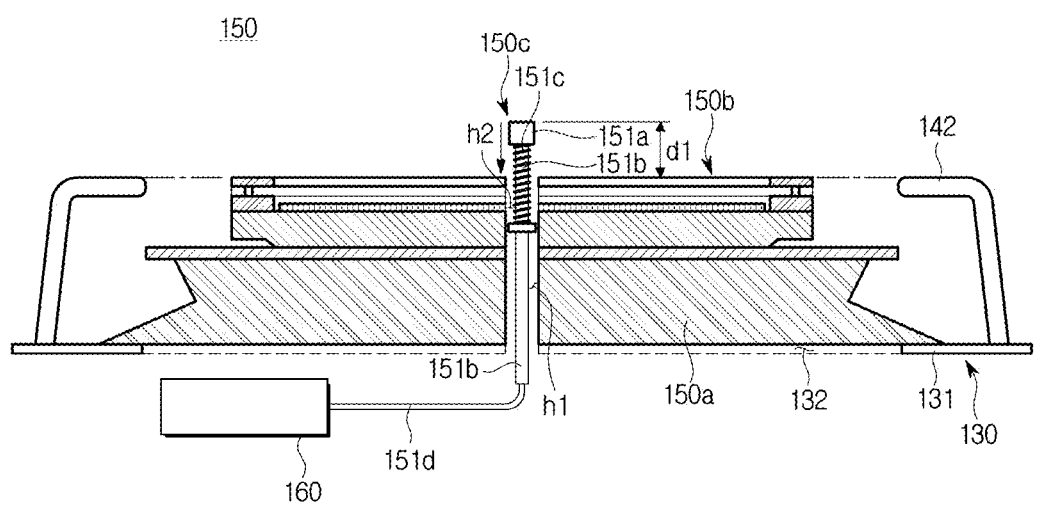
FIG. 3C illustrates a modification of a range assembly of a first cooking unit provided in a cooking apparatus in accordance with one embodiment of the present disclosure.

FIG. 3A illustrates a range assembly of a first cooking unit provided in a cooking apparatus in accordance with one embodiment of the present disclosure, FIG. 3B is a detailed configuration view showing a temperature detection unit provided in the range assembly shown in FIG. 3A, and FIG. 3C illustrates a modification of a range assembly of a first cooking unit provided in a cooking apparatus in accordance with one embodiment of the present disclosure. These will be described with reference to FIGS. 4, 5A, 5B, and 6.

As illustrated in FIG. 3A, the range assembly 150 includes a first heating unit 150a that generates heat using a first heat source, a second heating unit 150b that generates heat using a second heat source, and a temperature detection unit 150c that detects the temperature of the cooking vessel heated by at least one of the first heating unit and the second heating unit.

The first heat source may be gas and the second heat source may be electrical energy.

That is, the first heating unit 150a may be a gas range, and the second heating unit 150b may be an electric range.

The second heating unit 150b may be any one of a highlight electric range that directly heats a heating element using electricity, an induction electric range that generates heat in the cooking vessel exhibiting magnetism by forming a magnetic field in an electric coil, a hot plate that heats a coil type-electric heating wire below a cast iron or a coated heating plate, a sheath electric range constituted of a heating element and an insulator inside a steel pipe, and a halogen electric range that heats the cooking vessel with far-infrared power coming from a halogen lamp.

In addition, the second heating unit 150b may be a normal electric range in a ballpoint pen spring type or a fast electric range that generates heat using a fast heating element.

The first heating unit 150a of the range assembly 150 is arranged in the recessed portion 131 within the plate 130 of the first cooking unit 100a, and the second heating unit 150b is arranged to be brought into contact with an upper surface while being stacked on the first heating unit 150a.

The plane of the first heating unit 150a and the plane of the second heating unit 150b may be formed in a circular shape or non-circular shape, and the size of the first heating unit 150a may be the same as or different from the size of the second heating unit 150b.

Such a second heating unit 150b may be located inside the flame generated by the first heating unit 150a.

Because of this, it is possible to prevent the heat of the second heating unit from being emitted to the outside by the heat generated by the first heating unit. Accordingly, the range assembly 150 may reduce electrical energy consumed by the second heating unit while increasing a heating rate of the cooking vessel.

The first heating unit 150a of the range assembly 150 includes a first hole h1 and the second heating unit 150b includes a second hole h2 formed in a position corresponding to the first hole h1.

The first hole h1 and the second hole h2 may be formed at the center of the range assembly 150.

The temperature detection unit 150c is arranged to protrude to the outside of the second heating unit 150b by a predetermined distance d1 while being arranged in the first hole h1 of the first heating unit 150a and the second hole h2 of the second heating unit 150b, and is moved by the predetermined distance d1 toward the inside of the second hole h2 of the second heating unit 150b when being pressurized by the cooking vessel.

The height of the stacked first and second heating units 150a and 150b may be the same as the height of the support leg 142 of the support and the height of the pressurized temperature detection unit 150c.

That is, when the cooking vessel is placed on the range assembly 150, a bottom surface of the cooking vessel may be brought into contact with the support leg 142 of the support, a top surface of a panel of the second heating unit 150b, and the temperature detection unit 150c.

Accordingly, the temperature detection unit 150c may detect the temperature of the bottom surface of the cooking vessel.

In addition, the height of the stacked first and second heating units 150a and 150b is a height from the recessed portion 131 of the plate 130 to the support leg 142 of the support.

In addition, the height of the stacked first and second heating units 150a and 150b may be lower than the height of the support leg 142 of the support.

In addition, the height of the stacked first and second heating units 150a and 150b may be the same as that of the temperature detection unit 150c pressurized by the cooking vessel.

In addition, the height of the stacked first and second heating units 150a and 150b may be higher than the height of the support leg 142 of the support, and may be the same as the height of the support leg 142 of the support when being pressurized by the cooking vessel.

The temperature detection unit 150c includes a sensing portion 151a that protrudes from an upper surface of the second heating unit 150b and detects the temperature of the cooking vessel, a guidance portion 151b that is connected to the sensing portion 151a to receive a signal line of the sensing portion 151a and movably arranged inside the first hole h1 and the second hole h2, and an elastic member 151c that is arranged inside the first hole h1 or arranged adjacent to the first hole h1, allows the sensing portion 151a and the guidance portion 151b to be moved downward when the sensing portion 151a is pressurized and returns the sensing portion 151a and the guidance portion 151b to their original positions when the pressurization on the sensing portion 151a is released.

The elastic member 151c may be located within the sensing portion 151a.

As illustrated in FIG. 3B, the sensing portion 151a of the temperature detection unit has a size w2 smaller than a size w1 of the second hole h2.

Accordingly, the sensing portion 151a may be easily inserted into the second hole h2, and easily protrude to the outside from the second hole h2.

The guidance portion 151b may be made of a flexible material. Accordingly, the guidance portion 151b may prevent the failure of the sensing portion 151a when an external force is applied to the sensing portion 151a.

The guidance portion 151b has a reception portion and receives a line portion 151d having a signal line for transmitting and receiving a signal for sensing to and from the sensing portion 151a and a power line and signal line for transmitting and receiving power and a communication signal to and from the second heating unit 150b.

Here, the line of the second heating unit 150b connected to a driving module may be connected to the second heating unit in the first hole positioned in a head of the first heating unit through a connector.

The line portion 151d is connected to the driving module 160 and transmits and receives signals between the driving module and the first heating unit and between the second heating unit and the temperature detection unit.

Here, the driving module 160 may be a printed circuit board (PCB) for operating the plurality of range assemblies.

In addition, elastic members 151c may be respectively arranged at both sides of the guidance portion 151b.

In addition, the elastic member 151c may be arranged adjacent to the sensing portion 151a while being arranged within the guidance portion 151b.

FIG. 4 illustrates the first heating unit 150a of a range assembly provided in a cooking apparatus in accordance with one embodiment of the present disclosure.

The first heating unit 150a includes a venturi 153a through which supplied gas and air are mixed, a first valve 153b that is provided at the venturi 153a to block gas supply, a second valve 153c that is provided at the venturi 153a to adjust the amount of gas supply, a body 153d that is connected to the venturi 153a, a head 153e that is seated inside the body 153d, and a cap 153f that is detachably mounted at an upper portion of the head 153e.

In addition, the venturi may be a throat.

Here, the body 153d, the head 153e, and the cap 153f may be formed in an annular shape or non-annular shape.

The first valve 153b may be opened and closed by the driving module 160, and a degree of opening of the second valve 153c may be adjusted by the driving module 160.

The body 153d is located inside the main body of the cooking apparatus, and the head 153e and the cap 153f are located in the opening 132 formed in the plate 130 that covers the upper portion of the main body of the cooking apparatus. Primary air for combustion may be taken in the lower portion or upper portion of the plate 130.

A sawtooth-shaped groove is formed in the outer circumferential surface of the head 153e. When the head 153e is seated on the body 153d, a plurality of flame openings 153g are formed toward the outside. The plurality of flame openings 153g may be vertically oriented.

The body 153d, the head 153e, and the cap 153f have the first hole h1 formed in the same position, respectively.

The first heating unit 150a includes an ignition portion 153h that is operated by manipulation of a jog dial by a user.

Here, in the ignition portion 153h, auto-ignition may occur.

Figure 5A:
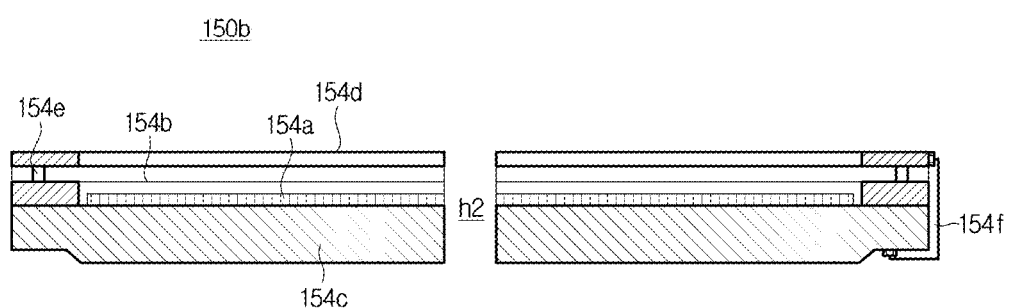
FIG. 5A illustrates a second heating unit of a range assembly provided in a cooking apparatus in accordance with one embodiment of the present disclosure.
Figure 5B:
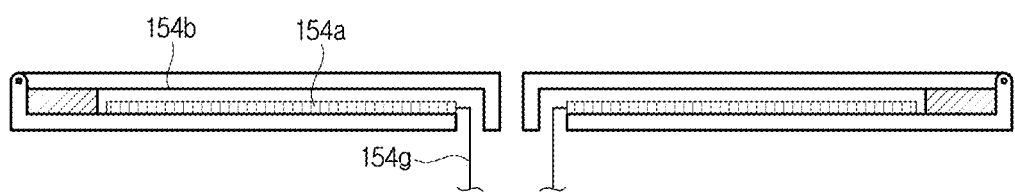
FIG. 5B illustrates a second heating unit of a range assembly provided in a cooking apparatus in accordance with one embodiment of the present disclosure, in detail.

FIG. 5A illustrates the second heating unit 150b of a range assembly provided in a cooking apparatus in accordance with one embodiment of the present disclosure, and FIG. 5B illustrates the second heating unit 150b of a range assembly provided in a cooking apparatus in accordance with one embodiment of the present disclosure, in detail.

As illustrated in FIG. 5A, the second heating unit 150b includes a heat generation unit 154a that generates heat using electrical energy, a housing 154b that receives the heat generation unit 154a, and an insulation portion 154c that is arranged to be brought into contact with the housing 154b and prevents the heat of the heat generation unit 154a from being moved to the first heating unit 150a side.

Here, the insulation portion 154c is removable from the second heating unit.

The heat generation unit may be directly fixed and arranged in the first heating unit by a fixing member, and in this instance, the fixing member may be provided as an elastic member.

As illustrated in FIG. 5B, the housing 154b may include an opening that has a reception space capable of receiving the heat generation unit 154a and allows a line 154g for supplying power to the heat generation unit 154a to be drawn out to the outside and to be connected to a driving module, and may be openably/closably provided so that the replacement of the heat generation unit 154a is possible. An elastic member is provided at the line 154g for supplying power so that the elastic member may be contracted when the cooking vessel is placed on the range assembly and relaxed when the cooking vessel is removed.

In this case, a height from the recessed portion 131 of the plate 130 to a panel 154d may be higher than a height from the recessed portion 131 of the plate 130 to the support leg 142, and a height of the temperature detection unit may be higher than a height of the support leg.

In addition, when the cooking vessel is placed on the range assembly, the height from the recessed portion 131 of the plate 130 to the panel 154d, the height of the support leg, and the height of the temperature detection unit may be all the same.

That is, the panel 154d, the support leg, and the temperature detection unit are all brought into contact with the bottom surface of the cooking vessel.

In this manner, when the height of the panel 154d of the second heating unit can be adjusted while the height of the panel 154d of the second heating unit is higher than the height of the support leg 142 of the support, it is possible to enhance a degree of adhesion between the panel 154d of the second heating unit and the cooking vessel.

That is, when the cooking vessel is placed on the panel 154d of the second heating unit, the height of the panel 154d of the second heating unit is made equal to the height of the support leg, so that it is possible to enhance a degree of adhesion between the panel 154d of the second heating unit and the cooking vessel.

The housing 154b is arranged to be stacked on the insulation portion 154c.

Next, the housing 154b and the insulation portion 154c respectively have a second hole h2 formed in the same position.

In this instance, the bottom surface of the cooking vessel may be brought into contact with a top surface of the housing 154b.

In addition, the second heating unit 150b may further include the panel 154d for protecting the heat generation unit 154a from an external force. The panel 154d may be made of tempered glass. In this case, the housing 154b is arranged to be stacked on the insulation portion 154c, and the panel 154d is arranged to be stacked on the housing 154b.

The insulation portion 154c, the housing 154b, and the panel 154d respectively have the second hole h2 formed in the same position.

The panel 154d may be formed to have the same size and shape as those of the housing 154b. The panel 154d may be fixed to the housing 154b by a fixing member 154e.

The housing 154b may be provided integrally with the panel 154d, and also provided integrally with the insulation portion. In addition, the housing may be made of the same material as that of the insulation portion.

Here, the fixing member 154e may be provided as an elastic member.

In addition, the housing 154b, the insulation portion 154c, and the panel 154d may be coupled to one another by a coupling member 154f.

Figure 6:
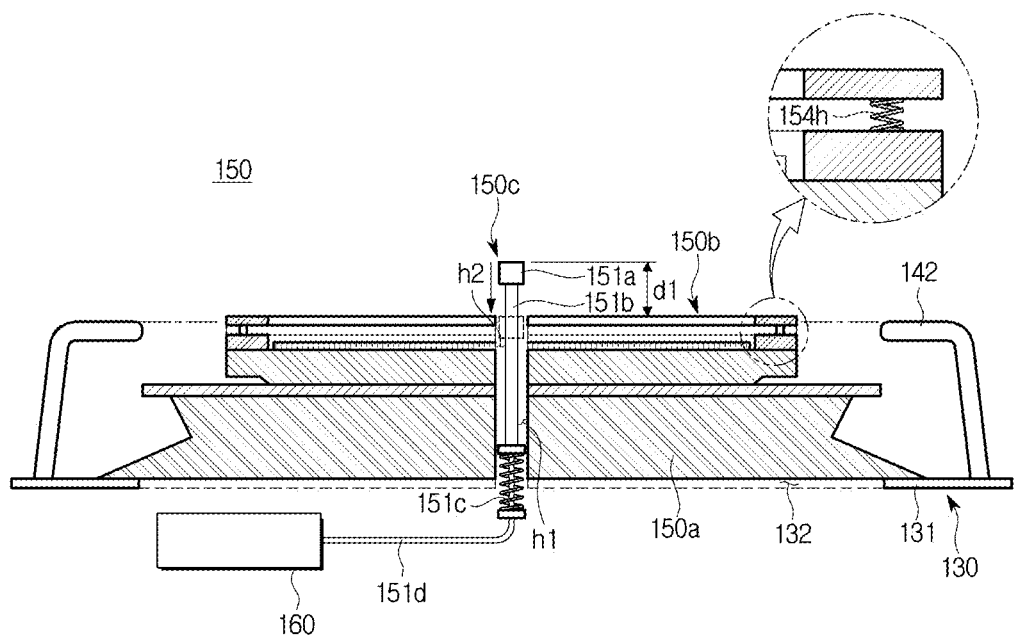
FIG. 6 illustrates a range assembly of a first cooking unit provided in a cooking apparatus in accordance with another embodiment of the present disclosure.

FIG. 6 illustrates a range assembly of a first cooking unit provided in a cooking apparatus in accordance with another embodiment of the present disclosure.

The range assembly 150 of the cooking apparatus in accordance with another embodiment includes a first heating unit 150a that generates heat using a first heat source, a second heating unit 150b that generates heat using a second heat source, and a temperature detection unit 150c that detects a temperature of a cooking vessel heated by any one of the first heating unit and the second heating unit.

The first heating unit 150a and the temperature detection unit 150c of the cooking apparatus in accordance with another embodiment of the present invention are the same as those described in the embodiment of FIG. 3A, and thus repeated description thereof will be omitted.

The second heating unit 150b of the cooking apparatus in accordance with another embodiment includes a heat generation unit 154a that generates heat using electrical energy, a housing 154b that receives the heat generation unit 154a, an insulation portion 154c that is arranged to be brought into contact with the housing 154b and prevents the heat of the heat generation unit 154a from being moved to the first heating unit 150a side, and a panel 154d that protects the heat generation unit 154a from an external force.

The heat generation unit 154a, the housing 154b, and the insulation portion 154c of the second heating unit 150b are the same as those in the above-described embodiment, and thus repeated description thereof will be omitted.

The second heating unit 150b of the cooking apparatus in accordance with another embodiment further includes a fixing member 154h for fixing the panel 154d to the housing 154b.

As illustrated in FIG. 6, the fixing member 154h of the range assembly may include an elastic member that connects the panel 154d and the housing 154b so that the panel 154d is fixed to the housing 154b, and may be contracted when the cooking vessel is placed on the panel 154d and relaxed when the cooking vessel is removed from the panel 154d.

In this case, a height from the recessed portion 131 of the plate 130 to the panel 154d may be higher than a height from the recessed portion 131 of the plate 130 to the support leg 142, and a height of the temperature detection unit may be higher than a height of the support leg.

In addition, when the cooking vessel is placed on the range assembly, the height from the recessed portion 131 of the plate 130 to the panel 154d, the height of the support leg, and the height of the temperature detection unit may be all the same.

That is, the panel 154d, the support leg, and the temperature detection unit may be all brought into contact with the bottom surface of the cooking vessel.

In this manner, when the height of the panel 154d of the second heating unit can be adjusted while the height of the panel 154d of the second heating unit is higher than the height of the support leg 142 of the support, it is possible to enhance a degree of adhesion between the panel 154d of the second heating unit and the cooking vessel.

That is, when the cooking vessel is placed on the panel 154d of the second heating unit, the height of the panel 154d of the second heating unit is made equal to the height of the support leg, so that it is possible to enhance a degree of adhesion between the panel 154d of the second heating unit and the cooking vessel.

Figure 7:
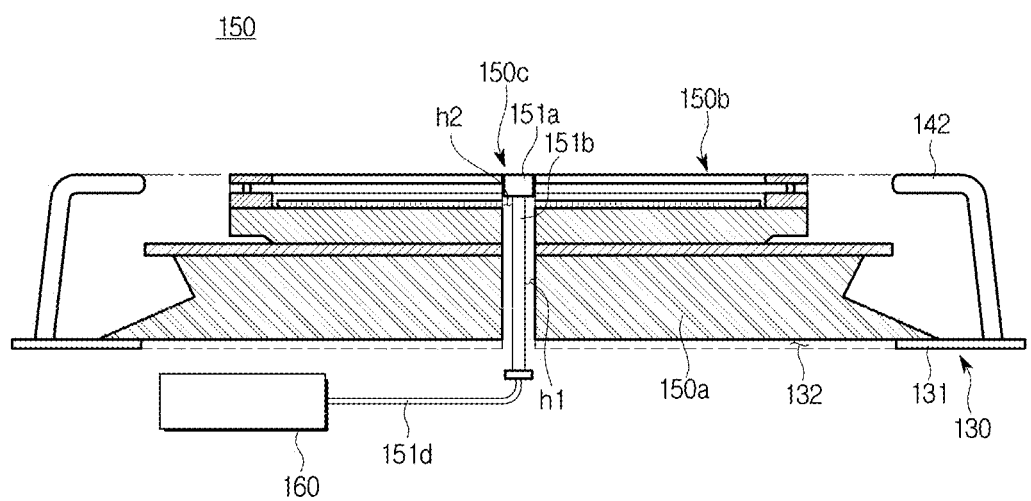
FIG. 7 illustrates a range assembly of a first cooking unit provided in a cooking apparatus in accordance with still another embodiment of the present disclosure.

FIG. 7 illustrates a range assembly of a first cooking unit provided in a cooking apparatus in accordance with still another embodiment of the present disclosure.

As illustrated in FIG. 7, the range assembly 150 includes a first heating unit 150a that generates heat using a first heat source, a second heating unit 150b that is stacked on the first heating unit 150a and generates heat using a second heat source, and a temperature detection unit 150c that detects a temperature of a cooking vessel heated by any one of the first heating unit and the second heating unit.

More specifically, the first heating unit 150a includes a venturi 153a through which supplied gas and air are mixed, a first valve 153b that is provided at the venturi 153a to block gas supply, a second valve 153c that is provided at the venturi 153a to adjust an amount of gas supply to be high or low, an annular body 153d that is connected to the venturi 153a, an annular or non-annular head 153e that is seated inside the body 153d, an annular or non-annular cap 153f that is detachably mounted at an upper portion of the head 153e, and an ignition portion 153h that is operated for ignition by manipulation of a jog dial by a user.

The second heating unit 150b includes a heat generation unit 154a that generates heat using electrical energy, a housing 154b that receives the heat generation unit 154a, an insulation portion 154c that is arranged to be brought into contact with the housing 154b and prevents the heat of the heat generation unit 154a from being moved to the first heating unit 150a side, and a panel 154d that protects the heat generation unit 154a from an external force.

The temperature detection unit 150c includes a sensing portion 151a that is arranged adjacent to a top surface of the panel 154d of the second heating unit 150b and detects the temperature of the cooking vessel, and a guidance portion 151b that is connected to the sensing portion 151a to support the sensing portion 151a and moves inside of a first hole h1 and a second hole h2.

The guidance portion 151b receives a line portion 151d having a line for transmitting and receiving a signal for sensing to and from the sensing portion 151a and a line for transmitting and receiving power and a communication signal to and from the second heating unit 150b.

The first heating unit 150a of the range assembly 150 includes the first hole h1, and the second heating unit 150b includes the second hole h2 formed in a position corresponding to the first hole h1.

The first hole h1 and the second hole h2 may be formed at the center of the range assembly 150.

The temperature detection unit 150c is arranged to have the same height as that of the upper surface of the second heating unit 150b while being arranged in the first hole h1 of the first heating unit 150a and the second hole h2 of the second heating unit 150b.

That is, the sensing portion 151a of the temperature detection unit 150c may be located in the second hole of the panel 154d of the second heating unit 150b.

In addition, the height of the stacked first and second heating units 150a and 150b may be the same as that of the support leg 142 of the support.

Accordingly, when the cooking vessel is placed on the range assembly, the support leg 142 of the support, the top surface of the panel 154d of the second heating unit 150b, and the sensing portion 151a of the temperature detection unit 150c may be brought into contact with the bottom surface of the cooking vessel.

That is, the sensing portion 151a of the temperature detection unit 150c may detect the temperature of the bottom surface of the cooking vessel.

Figure 8:
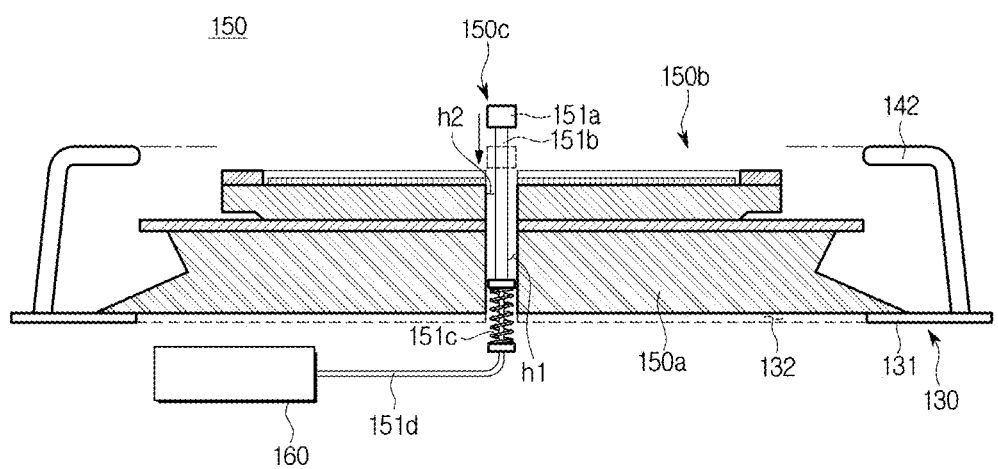
FIG. 8 illustrates a range assembly of a first cooking unit provided in a cooking apparatus in accordance with yet another embodiment of the present disclosure.

FIG. 8 illustrates a range assembly of a first cooking unit provided in a cooking apparatus in accordance with yet another embodiment of the present disclosure.

As illustrated in FIG. 8, the range assembly 150 includes a first heating unit 150a that generates heat using a first heat source, a second heating unit 150b that is stacked on the first heating unit 150a and generates heat using a second heat source, and a temperature detection unit 150c that detects the temperature of the cooking vessel heated by at least one of the first heating unit and the second heating unit.

The first heating unit 150a is the same as the first heating unit of FIG. 3A, and thus repeated description thereof will be omitted.

The second heating unit 150b includes a heat generation unit 154a that generates heat using electrical energy, a housing 154b that receives the heat generation unit 154a, and an insulation portion 154c that is arranged between the first heating unit and the housing 154b and prevents the heat of the heat generation unit 154a from being moved to the first heating unit 150a side.

The temperature detection unit 150c includes a sensing portion 151a that protrudes from an upper surface of the housing 154b of the second heating unit 150b and detects the temperature of the cooking vessel, a guidance portion 151b that is connected to the sensing portion 151a to receive a signal line of the sensing portion 151a and movably arranged inside a first hole h1 and a second hole h2, and an elastic member 151c that allows the sensing portion 151a and the guidance portion 151b to be moved downward when the sensing portion 151a is pressurized and returns the sensing portion 151a and the guidance portion 151b to their original positions when the pressurization on the sensing portion 151a is released.

The guidance portion 151b receives a line portion 151d having a line for transmitting and receiving a signal for sensing to and from the sensing portion 151a and a power line and a signal line for transmitting and receiving power and a communication signal to and from the second heating unit 150b.

The line portion 151d is connected to the driving module 160 to transmit and receive signals among the driving module, the first heating unit, the second heating unit, and the temperature detection unit.

The first heating unit 150a of the range assembly 150 includes the first hole h1, and the second heating unit 150b includes the second hole h2 formed in a position corresponding to the first hole h1.

The first hole h1 and the second hole h2 may be formed at the center of the range assembly 150.

The temperature detection unit 150c is arranged to protrude from the upper surface of the housing 154b of the second heating unit 150b by a predetermined distance while being arranged in the first hole h1 of the first heating unit 150a and the second hole h2 of the second heating unit 150b.

The temperature detection unit 150c may protrude to have a height higher than a height of the support leg 142 of the support.

When the cooking vessel is placed on the support leg of the support, the sensing portion 151a is pressurized by the cooking vessel and moved downward. In this instance, the sensing portion 151a is moved to the height of the support leg 142 of the support.

Here, the height of the support leg 142 of the support is the height from the recessed portion 131 of the plate.

Accordingly, when the cooking vessel is placed on the support leg of the support, the support leg 142 of the support and the sensing portion 151a of the temperature detection unit 150c may be brought into contact with the bottom surface of the cooking vessel.

That is, the sensing portion 151a of the temperature detection unit 150c may detect the temperature of the bottom surface of the cooking vessel.

Figure 9A:
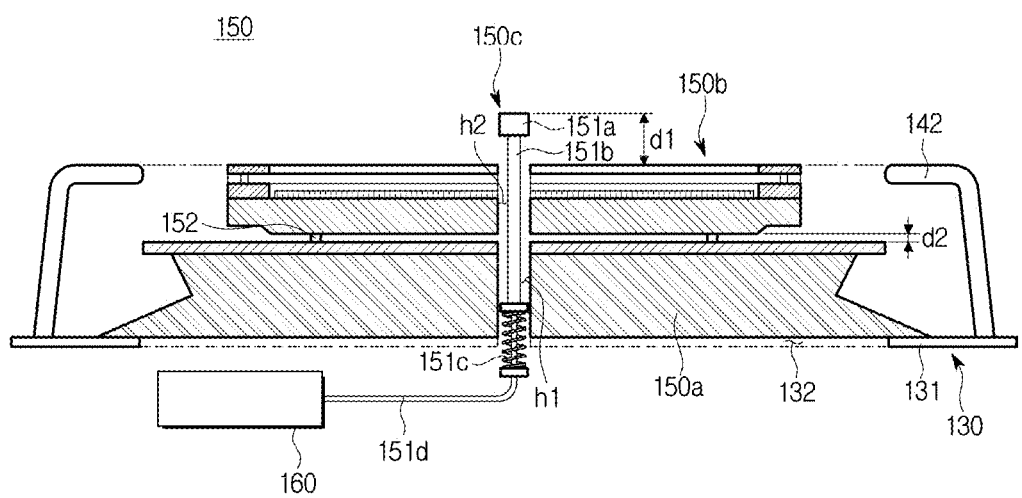
FIGS. 9A and 9B illustrate a range assembly of a first cooking unit provided in a cooking apparatus in accordance with yet another embodiment of the present disclosure.
Figure 9B:
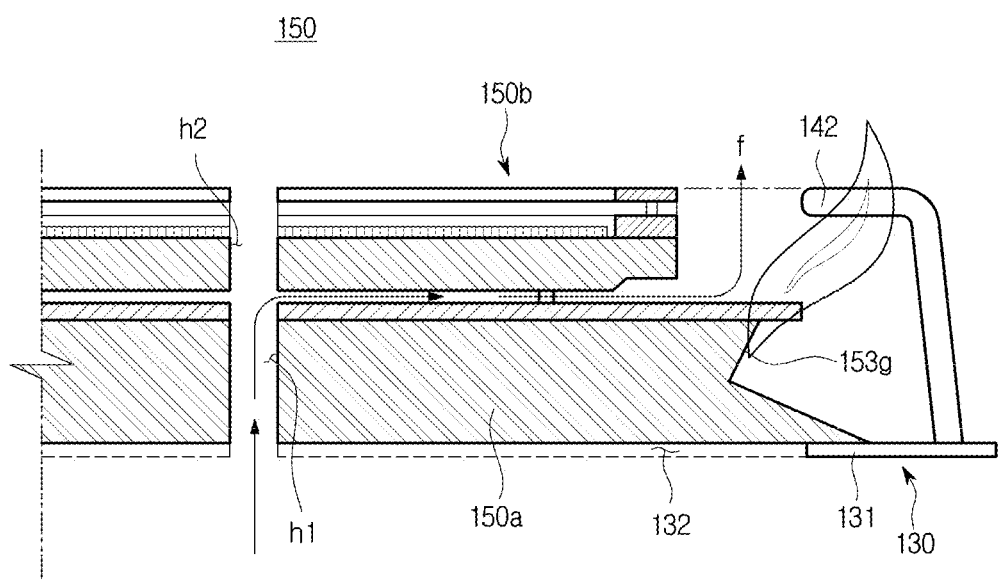

FIGS. 9A and 9B illustrate a range assembly of a first cooking unit provided in a cooking apparatus in accordance with yet another embodiment of the present disclosure.

As illustrated in FIG. 9A, the range assembly 150 in accordance with yet another embodiment of the present invention includes a second heating unit 150b that is arranged to be spaced apart from a first heating unit 150a by a predetermined distance d2 while being arranged to be stacked on top of the first heating unit 150a, unlike the range assembly 150 illustrated in FIG. 3A.

That is, the first heating unit 150a of the range assembly 150 is arranged in the recessed portion 131 inside the plate 130 of the first cooking unit 100a, and the second heating unit 150b is arranged to be spaced apart from the first heating unit 150a by the predetermined distance d2.

A support member 152 may be arranged between the first heating unit 150a and the second heating unit 150b.

That is, the second heating unit 150b may be arranged with a gap of the predetermined distance d2 from the first heating unit 150a by the support member 152.

The other components of the range assembly 150 of FIG. 9A are the same as those described in FIG. 3A, and thus repeated description thereof will be omitted.

As illustrated in FIG. 9B, a flow passage f of air may be formed between the first heating unit and the second heating unit of the range assembly, so that outside air is supplied while the first heating unit is operated, thereby improving the combustibility of gas of the first heating unit.

That is, a temperature of a lower portion of the first heating unit is relatively lower than a temperature of an upper portion thereof, and the temperature of the upper portion of the first heating unit is relatively higher than the temperature of the lower portion thereof, so that air flows from the lower portion of the first heating unit to the upper portion thereof, thereby improving the combustibility of gas.

In addition, the temperature detection unit 150c of the range assembly may be arranged at a distance in which the flame of the first heating unit 150a caused by wind does not reach when the first heating unit 150a has maximum heating power while being arranged at a predetermined distance from the flame opening 153g of the first heating unit 150a.

This distance may be obtained by experiment.

Accordingly, it is possible to prevent the temperature sensed by the temperature detection unit 150c from rising abruptly due to the flame of the first heating unit 150a.

Figure 10:
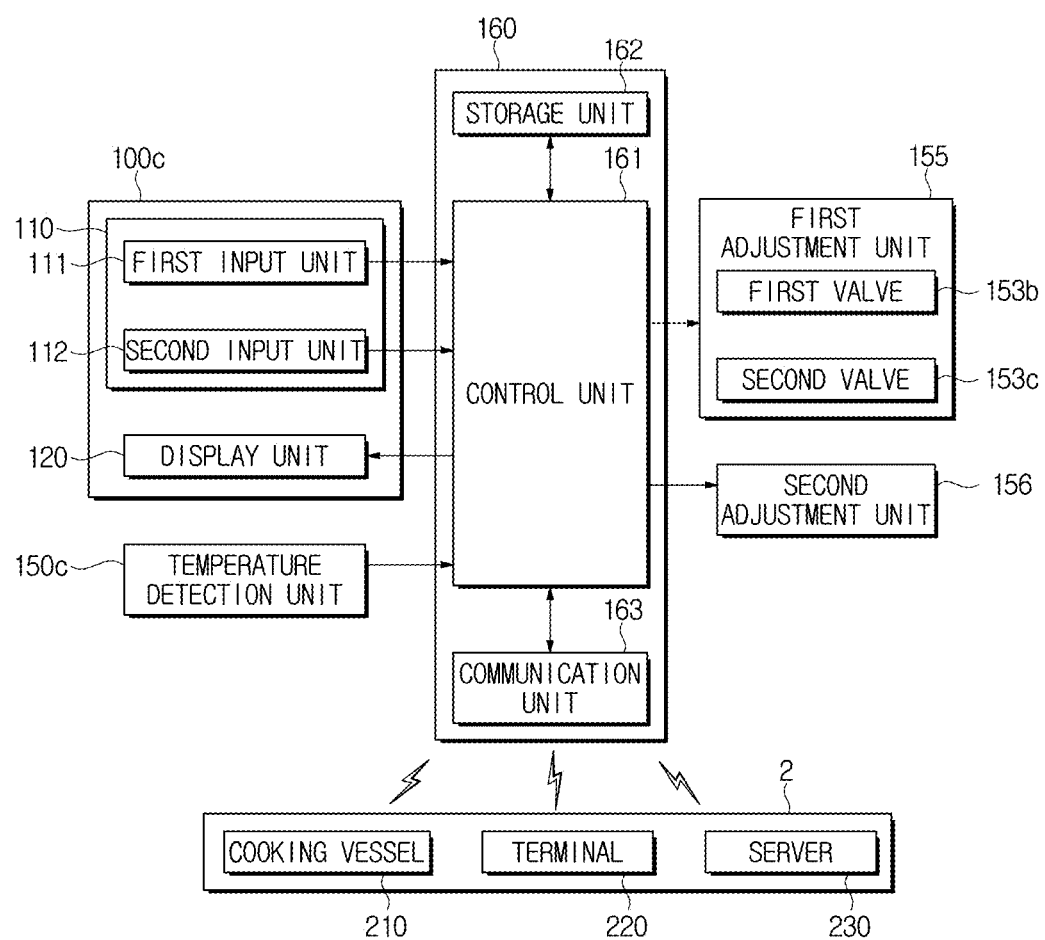
FIG. 10 is a control configuration view showing a cooking apparatus in accordance with one embodiment of the present disclosure.

FIG. 10 is a control configuration view showing a first cooking unit provided in a cooking apparatus in accordance with one embodiment of the present disclosure, and will be described with reference to FIGS. 11 to 16.

The control configuration of the first cooking unit of the cooking apparatus may be implemented when the range assembly illustrated in FIGS. 3A, 6, 7, 8, and 9A is controlled.

The cooking apparatus 1 includes a user interface 100c, a temperature detection unit 150c, a first adjustment unit 155, a second adjustment unit 156, and a driving module 160.

The user interface 100c includes an input unit 110 that receives cooking information and transmits the received cooking information to the driving module 160, and a display unit 120 that displays the received cooking information and operation information of the range assembly while displaying information based on a control signal of the driving module 160.

The input unit 110 includes a first input unit 111 that receives an output level of at least one range assembly provided in the first cooking unit 100a and a second input unit 112 that receives cooking information of the at least one range assembly provided in the first cooking unit 100a.

Here, the first input unit 111 may be provided to be matched for each of the range assemblies, and adjust the output level of the matched range assembly.

In addition, the first input unit 111 may receive a heating level of the first heating unit 150a, and the second input unit 112 may receive a heating level of the second heating unit 150b.

That is, the cooking apparatus may receive the heating level of each of the first heating unit 150a and the second heating unit 150b of the range assembly provided in the first cooking unit.

Here, the first input unit 111 and the second input unit 112 may be provided in the form of a jog dial, a physical button, or a touch button.

The first input unit 111 may receive cooking reservation information. Here, the cooking reservation information includes a location of the range assembly to be used for cooking, a menu to be cooked, a cooking start time, and a cooking end time.

The display unit 120 displays the received cooking information, and also displays the cooking information while the first cooking unit 100a and the second cooking unit 100b are operated.

Here, the cooking information input to the input unit 110 may include at least one of an output level of the range assembly, a heating level of the first heating unit, a heating level of the second heating unit, cooking reservation information, a type of food, a cooking method, and a cooking time.

Figure 11:
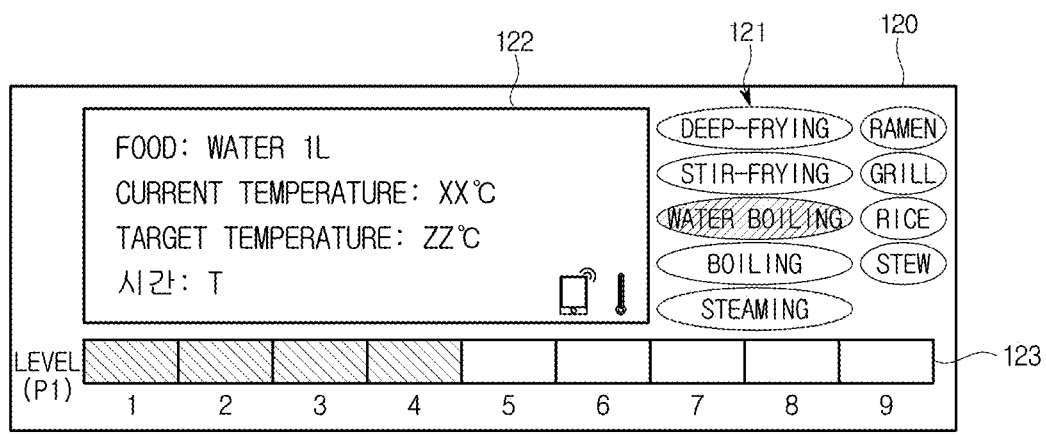
FIGS. 11 and 12 illustrate a user interface provided in a cooking apparatus in accordance with one embodiment of the present disclosure.

As illustrated in FIG. 11, the cooking information displayed on the display unit 120 as illustrated in FIG. 11 may include at least one of the output level of the range assembly, the heating level of the first heating unit, the heating level of the second heating unit, the type of food, the cooking method, the cooking time, the cooking reservation information, and communication information with an external device.

Such a display unit 120 may include a menu window 121 that displays an input cooking menu, a guidance information window 122 that displays a current temperature of the cooking vessel, a target temperature of the cooking vessel, and a cooking time, and a level window 123 that displays the output level of the range assembly which is currently operated.

Here, the guidance information window 122 may display alarm information using an emoticon when a temperature of heat generated by the range assembly exceeds a limit temperature or a cooking time that has elapsed after the start of cooking exceeds a limit time, display whether to communicate with the external device using an emoticon, or display the cooking reservation information.

In this instance, the cooking reservation information includes an emoticon which means cooking reservation, the location of the range assembly to be used for cooking, the menu to be cooked, the cooking start time, or the cooking end time.

In addition, the guidance information window 122 of the display unit may display the alarm information when there is no cooking vessel in the location of the range assembly to be used for cooking in a cooking reservation state, and also display cancellation information of the cooking reservation.

The cooking apparatus may further include a sound unit (not shown) that outputs the alarm information as sound.

The cooking time may be a time that has elapsed starting from the cooking start time or a time remaining until a cooking completion time.

The same number of level windows 123 as the number of the range assemblies provided in the first cooking unit may be provided.

In addition, only one level window 123 may be provided, and in this case, may display an identification number of the range assembly selected by a user along with an output level of the range assembly.

Figure 12:
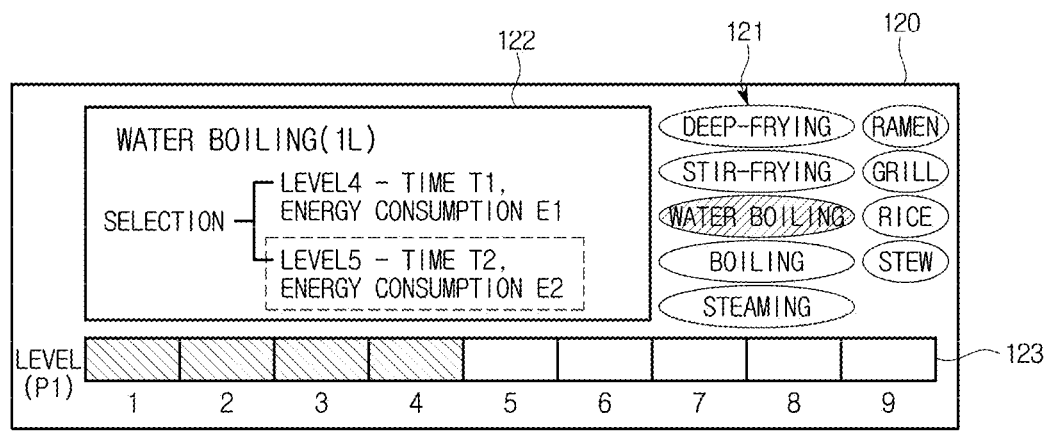

As illustrated in FIG. 12, the display unit 120 of the user interface 100c may recommend and display an output level that is suitable for cooking of the cooking menu selected by the user on the guidance information window 122.

In this case, the display unit 120 may display a plurality of selectable output levels, a time consumed when food is cooked at each output level, and energy consumption.

Accordingly, the cooking apparatus may allow a user to select the output level that is suitable for a user's situation.

For example, when desiring to boil water in a short time, a user may select an output level 5 having a short required time. In this instance, the cooking apparatus may receive the selection of the output level 5 through the second input unit, and operate the range assembly to boil water at the selected output level 5.

When desiring to boil water with small energy consumption, the user may select an output level 4 having small energy consumption. In this instance, the cooking apparatus may receive the selection of the output level 4 through the second input unit, and operate the range assembly to boil water at the selected output level 4.

The display unit 120 may display menu cumulative information.

Here, the cumulative information includes the temperature of the cooking vessel over the cooking time.

For example, in a case in which cooking information for boiling 1L of water is input, the display unit displays the temperature over time for each of the output levels when 1L of water was boiled in the past.

In addition, when a plurality of pieces of cumulative information for boiling 1L of water in the past are provided, the display unit may display an average temperature of the cooking vessel over time for each of the output levels. Such a user interface 100c may be implemented as a touch screen in which the input unit 110 and the display unit 120 are integrally formed.

The temperature detection unit 150c detects the temperature of the cooking vessel positioned in the range assembly, and transmits the detected temperature to the driving module 160.

The cooking apparatus may further include a weight detection unit (not shown) that detects the weight of the cooking vessel positioned in the range assembly.

Such a weight detection unit may be provided at a lower portion of the elastic member 151c.

The first adjustment unit 155 is used to adjust the supply of gas of the first heating unit, and includes a first valve 153b that blocks gas supply of the first heating unit and a second valve 153c that adjusts the amount of gas supply of the first heating unit.

Here, the first valve 153b may be a solenoid valve that is arranged at the venturi 153a and opens and closes a flow passage of the venturi 153a based on on/off control signals transmitted from the driving module 160, and the second valve 153c may be a high-low valve or a stepping motor that is arranged at the venturi 153a and adjusts a degree of opening of the flow passage of the venturi 153a based on a control signal transmitted from the driving module 160.

The second adjustment unit 156 may adjust a current supplied to the heat generation unit 154a so that the amount of heat generation of the heat generation unit 154a may be adjusted.

Such a second adjustment unit 156 may include a switching element for performing pulse width modulation (PWM) of the current supplied to the heat generation unit 154a.

The second adjustment unit 156 may be arranged at the driving module 160, and connected to the heat generation unit 154a of the second heating unit through the signal line, and thereby transmit an operation signal to the heat generation unit 154a of the second heating unit.

The driving module 160 may be a printed circuit board (PCB) for operating a plurality of range assemblies, electrically connected to the temperature detection unit 150c arranged outside of the cooking apparatus through the signal line, and electrically connected to the heat generation unit 154a of the second heating unit through the signal line and the power line.

In addition, the driving module 160 may be electrically connected to the first valve 153b and the second valve 153c through the signal line, thereby transmitting the control signal.

Such a driving module 160 may include a control unit 161, a storage unit 162, and a communication unit 163.

Here, the control unit 161 may be a processor, a CPU (central processing unit), an MCU (main control unit), or the like, and the storage unit 162 may be a memory such as an RAM (random access memory) that can be read and written, an ROM (read only memory) that can be read, or the like.

The communication unit 163 may include a wireless communication module such as an infrared (IR) communication, RF (radio frequency) communication, Wi-Fi communication, or Bluetooth communication module.

When the first input unit is manipulated by a user, the control unit 161 determines a heating level of the first heating unit 150a, adjusts the amount of gas supply based on the determined heating level of the first heating unit 150a, and controls the operation of the second heating unit 150b, so that the heat is reinforced.

The control unit 161 may determine the manipulated first input unit, determine the range assembly matched with the determined first input unit, and control the identification number of the determined range assembly to be displayed, or control the operation of the second heating unit provided in the determined range assembly.

The control unit 161 determines a detected temperature during the operation of the range assembly, and controls output of alarm information when the detected temperature is a limit temperature or higher.

That is, the control unit 161 may control the display unit 120 so that the alarm information may be displayed on the display unit 120, or control the communication unit 163 so that the alarm information may be transmitted to an external device.

In addition, in a case in which heat is reinforced using the second heating unit 150b, the control unit 161 may control the operation of the second heating unit 150b to be stopped when the detected temperature is the limit temperature or higher.

The control unit 161 determines the output level input to the input unit 110, and determines the heating level of the first heating unit and the heating level of the second heating unit corresponding to the determined output level, thereby controlling the operation of the first heating unit 150a and the second heating unit 150b.

That is, the control unit 161 adjusts the opening and closing of the first valve 153b and a degree of opening of the second valve 153c based on the determined heating level of the first heating unit 150a, and controls PWM of the current flowing in the heat generation unit 154a based on the determined heating level of the second heating unit 150b.

When a menu is input to the input unit 110 or the communication unit 163 receives the menu, the control unit 161 determines cooking information corresponding to the menu, determines the output level for each cooking time corresponding to the determined cooking information, and controls the operation of the first heating unit 150a and the second heating unit 150b based on the output level for each determined cooking time.

When the output level is changed during cooking, the control unit 161 controls the operation of the first heating unit 150a and the second heating unit 150b based on the changed output level.

In addition, the control unit 161 determines a recommendation output level corresponding to the menu and the amount of cooking, and controls the display of the determined recommendation output level.

Here, the control unit 161 may give a user a choice by controlling the display unit 120 so that the cooking time along with the energy consumption in cooking may be displayed at each recommendation output level.

When any one among a plurality of recommendation output levels is selected, the control unit 161 controls the operation of the first heating unit 150a and the second heating unit 150b based on the selected output level.

The control unit 161 determines whether the first heating unit 150a is stopped based on the temperature detected during the operations of the first heating unit 150a and the second heating unit 150b, and off-controls the first valve 153b when it is determined that the first heating unit 150a is stopped.

The control unit 161 determines whether water is present within the cooking vessel based on a change in the temperature detected by the temperature detection unit 150c, and controls the output of alarm information when it is determined that there is no water within the cooking vessel.

The control unit 161 determines a position in which the cooking vessel is placed based on input information of the input unit 110, and controls the display of an identification number of the range assembly corresponding to the determined position.

The control unit 161 may control whether the cooking vessel is present based on the weight detected by the weight detection unit (not shown), determine the position in which the cooking vessel is placed, and control the display of the identification number of the range assembly corresponding to the determined position.

In addition, the control unit 161 may predict the amount of cooking of food inside the cooking vessel based on the weight detected by the weight detection unit (not shown) and the type of the menu, and predict the cooking time based on the predetermined amount of cooking.

The control unit 161 may determine the heating level of the first heating unit and the heating level of the second heating unit each corresponding to the output level, and control the output of each of the amount of gas, gas costs corresponding to the amount of gas, power consumption, and electricity costs corresponding to the power consumption.

In addition, when the second heating unit is an induction electric range, the cooking apparatus may further include a current detection unit that detects the current flowing in each coil.

In this instance, the control unit 161 may determine the position of the cooking vessel and whether the cooking vessel is used based on the detected current, and allows cooking vessel information including the determined position and whether the cooking vessel is used to be displayed on the display unit 120.

The control unit 161 determines a menu and a cooking start time when cooking reservation information is input, determines an output level of a reservation menu when a current time is determined to be the cooking start time, and controls auto-ignition and the heating level of the first heating unit and controls the heating level of the second heating unit while controlling the operation of each of the first heating unit and the second heating unit based on the determined output level.

In addition, when it is determined that a cooking end time other than the cooking start time is input to the cooking reservation information, the control unit 161 may determine a cooking required time corresponding to the reservation menu, obtain the cooking start time based on the determined cooking required time and the cooking end time, and control the operation of each of the first heating unit and the second heating unit at the obtained cooking start time.

In addition, when it is determined that the cooking reservation information is input, the control unit 161 may control the communication unit so that cooking performance information may be transmitted to a user's terminal when cooking is started.

In addition, the control unit 161 may determine whether the cooking vessel is present in the position of the range assembly to be used for cooking when the cooking reservation information is input, control the output of the alarm information indicating absence of the cooking vessel when it is determined that there is no cooking vessel in the position of the range assembly to be used for cooking, and cancel the cooking reservation when it is determined that there is no cooking vessel even though a predetermined time has elapsed.

The control unit 161 determines whether constant temperature control is required based on the menu, and adjusts at least one of the heating level of the first heating unit and the heating level of the second heating unit based on the temperature of the cooking vessel detected by the temperature detection unit when it is determined that the constant temperature control is required.

The control unit 161 may adjust the heating level of at least one of the first heating unit and the second heating unit based on a change in the energy consumption or a change in the cooking time at the time of the constant temperature control.

The control unit 161 may adjust the heating level of the second heating unit of which the heating level control is easy at the time of the constant temperature control.

The control unit 161 controls the storage of temperature information of the cooking vessel over time when the range assembly is operated.

The control unit 161 controls the display of cumulative information stored in the storage unit when a cooking menu, an amount of cooking, and an operation command of the range assembly are input.

In addition, when a plurality of pieces of cumulative information are provided, the control unit 161 calculates an average temperature of the cooking vessel over time, and controls the display of the average temperature of the cooking vessel over time.

The control unit 161 determines a time that has elapsed from the cooking start time during cooking, and controls the output of overheating alarm information when the determined time passes a limit time. The control unit 161 may determine a target temperature corresponding to the cooking menu, and output the overheating alarm information when the detection temperature of the cooking vessel is higher than the target temperature by a predetermined value.

The storage unit 162 stores a plurality of output levels for each of the range assemblies.

As illustrated in FIG. 13, the plurality of output levels may be set by a combination of the heating level of the first heating unit and the heating level of the second heating unit.

The heating level of the first heating unit may include off, a low level, and a high level, and the heating level of the second heating unit may include off, a minimum level (MIN), a middle level (MID), and a maximum level (MAX), and the output levels may include levels 1 to 9.

The storage unit 162 may store the target temperature corresponding to the plurality of output levels, and also store the limit temperature for limiting the heat of the range assembly.

The storage unit 162 may store the output level per unit time corresponding to the menu. In this case, the storage unit 162 may store cooking information corresponding to the amount of cooking for the menu.

The storage unit 162 may store the recommendation output level for each menu, the cooking time, and the energy consumption for each output level.

The storage unit 162 may store the amount of gas for each heating level of the first heating unit and the gas costs corresponding to the amount of gas, and also store the power consumption for each heating level of the second heating unit and the electricity costs corresponding to the power consumption.

The storage unit 162 may accumulate and store temperature information of the cooking vessel over the cooking time for each menu.

The communication unit 163 performs communication with an external device 2.

The communication unit 163 transmits the cooking information of the cooking apparatus to the external device 2, or transmits the cooking information transmitted from the external device 2, to the control unit 161.

The cooking information transmitted to the external device 2 includes at least one piece of operating status information such as whether the plurality of range assemblies are used for cooking, the identification number and output level of the range assembly which is currently used for cooking, the detection temperature, the type of food, and the like.

The cooking information transmitted from the external device may include the heating level of the first heating unit, the heating level of the second heating unit, the output level of the range assembly, the output level per unit time corresponding to the menu, and cooking interruption information.

Here, the external device 2 may be a cooking vessel 210, a movable terminal 220, and a server 230, and also may be electric equipment (not shown) such as a refrigerator, a television, a washing machine, a dish washer, and the like which are arranged in a home.

Such an external device 2 may be a device that includes a display unit, and display cooking information transmitted from the cooking apparatus and transmit cooking information selected by a user to the cooking apparatus 1.

This will be described with reference to FIGS. 14 to 16.

Figure 14:
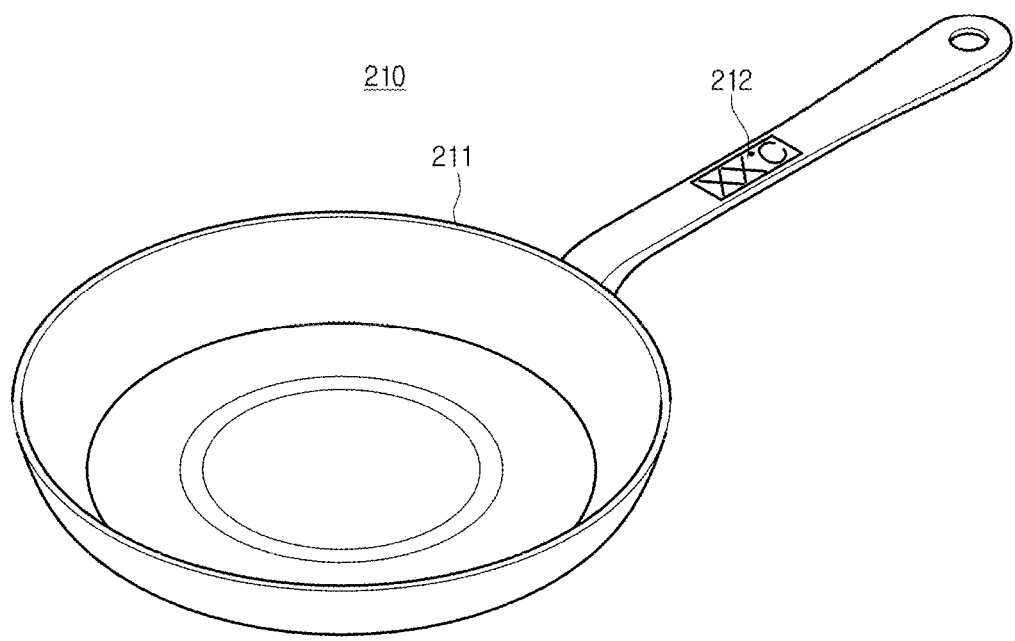
FIG. 14 illustrates a cooking vessel performing communication with a cooking apparatus in accordance with one embodiment of the present disclosure.

FIG. 14 illustrates a cooking vessel 210 for performing wireless communication with a cooking apparatus 1 in accordance with one embodiment of the present disclosure.

The cooking vessel 210 includes a receiving unit 211 for receiving food, and a display unit 212 that displays a temperature of a bottom surface of the receiving unit 211.

Such a cooking vessel 210 may perform communication with the cooking apparatus 1 during food preparation and display the temperature detected and transmitted by the cooking apparatus 1 on the display unit 212, so that a user may readily recognize the cooking temperature.

The cooking vessel 210 may display an elapsed cooking time and a remaining cooking time in addition to the temperature.

Figure 15:
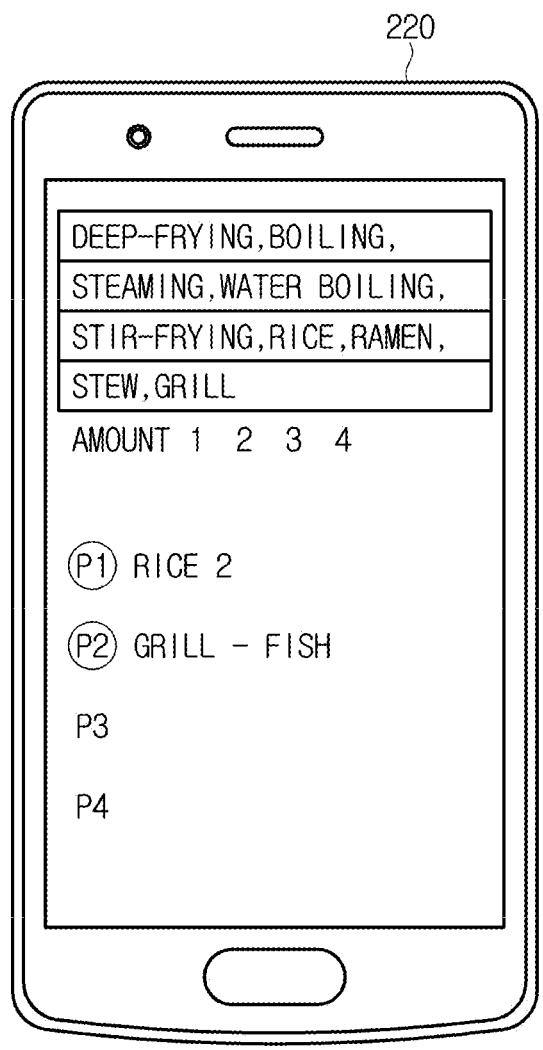
FIGS. 15 and 16 illustrate a terminal performing communication with a cooking apparatus in accordance with one embodiment of the present invention.
Figure 16:
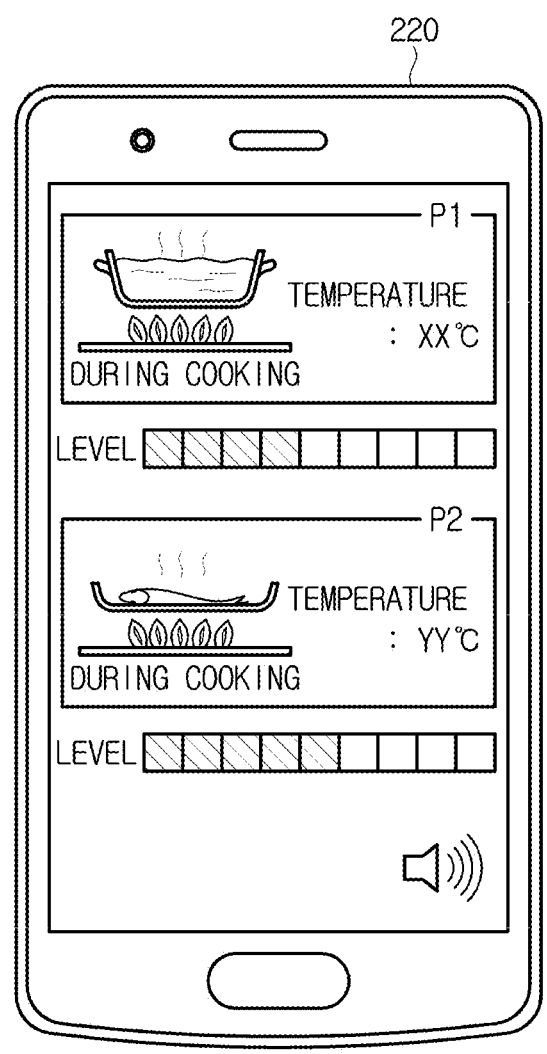

FIGS. 15 and 16 illustrate a terminal 220 performing wireless communication with a cooking apparatus 1 in accordance with one embodiment of the present invention.

The terminal 220 performs communication with the cooking apparatus 1, and receives operation information for controlling the operation of the range assembly on which the cooking vessel with food received therein is placed.

As illustrated in FIG. 15, the terminal 220 includes a user interface such as a touch screen, displays a plurality of menu items which are selectable by a user, and displays a quantity button for receiving the amount of the selected menu.

Next, the terminal 220 displays the identification number of the range assembly selected by the user through a touch, a menu and the amount of cooking which are types of cooking information, and transmits the displayed identification number of the range assembly and cooking information to the cooking apparatus 1.

In addition, the terminal 220 may display an identification number of the selected range assembly as different display information from the range assembly which is not selected, so that the selected range assembly and the non-selected range assembly may be distinguished from each other.

In addition, the terminal 220 may receive and display cooking reservation information, and receive and display cancellation information of the cooking reservation.

As illustrated in FIG. 16, the terminal 220 performs communication with the cooking apparatus 1, and displays an identification number of at least one range assembly which is currently operated and cooking information, when at least one of a plurality of range assemblies is operated.

The cooking information displayed on the terminal 220 may include a menu to be cooked, a cooking status, a temperature of the cooking vessel, and an output level, and the temperature of the cooking vessel may include a detection temperature and a target temperature.

In this manner, the terminal 220 may display the temperature of the cooking vessel, so that a user may easily recognize the cooking temperature.

In addition, the terminal 220 may display alarm information as an emoticon together with the identification number of the range assembly when the temperature of the cooking vessel positioned on the at least one range assembly is a limit temperature or higher.

The cooking apparatus 1 may perform communication with the server 230, and store information provided from the server 230.

That is, the cooking apparatus 1 may be provided with the output level per unit time corresponding to the menu from the server 230.

In addition, the cooking apparatus 1 may be provided with the cooking information corresponding to the amount of cooking for each menu from the server 230.

The cooking apparatus 1 may be provided with the amount of gas for each heating level of the first heating unit and gas costs corresponding to the amount of gas, also provided with update information in the future. In addition, the cooking apparatus 1 may be provided with the power consumption for each heating level of the second heating unit and electricity costs corresponding to the power consumption, and also provided with update information in the future.

Hereinafter, an example of a control of the operation of the cooking apparatus will be described.

First, the control of the operation of the range assembly of the cooking apparatus for increasing the operating efficiency of the range assembly will be described.

The cooking apparatus may enable the operation of the range assembly on which the cooking vessel is placed to be performed, when the cooking vessel is placed on the support and the first input unit 111 is manipulated.

That is, when gas is supplied to the venturi 153*a* by the manipulation of the first input unit 111 and ignition occurs, the range assembly 150 may generate heat for cooking food by generating a flame through the first heating unit 150*a*.

When a plurality of range assemblies are provided, the cooking apparatus may determine the location of the manipulated first input unit, determine the range assembly matched with the first input unit of the determined location, and control the identification number of the determined range assembly to be displayed on the display unit.

Next, the cooking apparatus may operate the second heating unit provided in the determined range assembly.

Here, the operation of the second heating unit includes generation of heat in the heat generation unit due to power supply to the heat generation unit of the second heating unit 150*b*.

In this manner, the cooking apparatus may prevent the heat of the first heating unit from being moved to the second heating unit side by simultaneously operating the first heating unit and the second heating unit, thereby preventing a heat loss of the first heating unit.

In addition, the heat of the second heating unit may be prevented from being emitted to the outside by the heat generated by the first heating unit, and therefore it is possible to increase the thermal efficiency of the second heating unit even with less energy, thereby increasing the heating rate.

The energy can be increased even with a small thermal efficiency heating of the second heating unit, thereby increasing a heating rate of the food.

The cooking apparatus detects the temperature of the bottom surface of the cooking vessel using the temperature detection unit during the operation of the range assembly, and compares the detected temperature and a preset limit temperature.

When the detected temperature is lower than the preset limit temperature, the cooking apparatus outputs the detected temperature and maintains the operation each of the first heating unit and the second heating unit.

Here, the outputting of the detected temperature includes displaying the detected temperature on the display unit 120 of the cooking apparatus.

In addition, the outputting of the detected temperature includes displaying the detected temperature on a display unit provided in an external device 2 performing communication with the cooking apparatus.

The cooking apparatus determines whether cooking is completed. Here, the determining of whether the cooking is completed includes determining whether the first input unit 111 is off-operated.

When it is determined that cooking is not completed, the cooking apparatus determines whether the operation of the first heating unit is stopped based on the detected temperature.

When it is determined that the operation of the first heating unit is stopped, the cooking apparatus may close a flow passage of the corresponding pipe by turning off the first valve to shut off gas, and thereby prevent the leakage of the gas to the inner space.

The cooking apparatus may enable the cooking of the food to be completed by supplying heat to the cooking vessel using the second heating unit even in a state in which the operation of the first heating unit is stopped.

On the other hand, when it is determined that the operation of the first heating unit is stopped, the cooking apparatus repeatedly performs a process of detecting the temperature, comparing with the limit temperature, and outputting the detected temperature until the cooking is completed.

When it is determined that the cooking is completed, the cooking apparatus stops the heating unit which is currently operated, and outputs cooking completion information.

Here, the outputting of the cooking completion information includes displaying the cooking completion information on the display unit 120 of the cooking apparatus.

In addition, the outputting of the cooking completion information includes displaying the cooking completion information on the display unit provided in the external device 2 performing communication with the cooking apparatus.

When it is determined that the temperature detected during cooking is the limit temperature or higher, the cooking apparatus outputs alarm information, and stop the operation of the second heating unit in order to reduce the temperature of the cooking vessel.

Here, the outputting of the alarm information includes displaying the alarm information on the display unit 120 of the cooking apparatus and outputting an alarm sound through the sound unit (not shown) of the cooking apparatus.

In addition, the outputting of the alarm information includes displaying the alarm information on the display unit provided in the external device 2 performing communication with the cooking apparatus.

Through this, a user may readily recognize overheating of the cooking vessel.

In addition, when the detected temperature is the limit temperature or higher, the cooking apparatus may prevent the overheating of the cooking vessel by reducing the output level of the range assembly, and prevent the occurrence of fires by preventing the overheating.

The cooking apparatus supplies heat to the cooking vessel by operating only the first heating unit in a state in which the operation of the second heating unit is stopped, and determines whether the cooking is completed.

When it is determined that the cooking is completed, the cooking apparatus outputs the cooking completion information.

In this manner, the cooking apparatus may enable the cooking of the food to be completed by operating only the first heating unit even in a state in which the operation of the second heating unit is stopped.

The cooking apparatus determines whether the first heating unit is stopped while performing cooking by operating only the first heating unit even in a state in which the operation of the second heating unit is stopped.

When it is determined that the first heating unit is also stopped in a state in which the operation of the second heating unit is stopped, the cooking apparatus may shut off gas by turning off the first valve 153b and output alarm information.

In addition, when it is determined that the first heating unit is also stopped in a state in which the operation of the second heating unit is stopped, the cooking apparatus may shut off the gas by turning off the first valve 153b, and then operate the second heating unit to allow the cooking to be completed.

Hereinafter, the operation of the range assembly of the cooking apparatus will be described based on the output level.

When the cooking vessel is placed on the support and the first input unit 111 is manipulated, the cooking apparatus may enable gas to be supplied through the venturi 153a and perform ignition, so that a flame may be generated in the first heating unit 150a.

The cooking apparatus receives the output level from the input unit 110 or the communication unit 163.

Here, the order of the receiving of the output level and the performing of ignition of the first heating unit may be changeable.

The cooking apparatus determines a heating level of the first heating unit and a heating level of the second heating unit each corresponding to the received output level, and operates at least one of the first heating unit and the second heating unit based on the determined heating levels of the first and second heating units.

For example, the cooking apparatus may operate the second heating unit at a minimum level when the output level is 1, operate the first heating unit at a low level when the output level is 2, and operate the second heating unit at the minimum level and the first heating unit at the low level when the output level is 4.

The cooking apparatus detects the temperature of the bottom surface of the cooking vessel during the operation of at least one heating unit of the range assembly, and compares the detected temperature with a preset limit temperature.

When it is determined that the temperature detected during cooking is the limit temperature or higher, the cooking apparatus outputs alarm information, and down-adjusts the heating level which is currently operated by one level in order to reduce the temperature of the cooking vessel.

In addition, the cooking apparatus down-adjusts the heating level of the second heating unit when the first heating unit and the second heating unit are both operated.

Here, the outputting of the alarm information includes displaying the alarm information on the display unit 120 of the cooking apparatus and outputting an alarm sound through the sound unit (not shown) of the cooking apparatus.

In addition, the outputting of the alarm information includes displaying the alarm information on the display unit provided in the external device 2 performing communication with the cooking apparatus.

When the detected temperature is lower than the preset limit temperature, the cooking apparatus outputs the detected temperature, and maintains the operation of at least one heating unit.

Here, the outputting of the detected temperature includes displaying the detected temperature on the display unit 120 of the cooking apparatus.

In addition, the outputting of the detected temperature includes displaying the detected temperature on the display unit provided on the external device 2 performing communication with the cooking apparatus.

The cooking apparatus determines whether the cooking is completed.

Here, the determining of whether the cooking is completed includes determining whether the operation time of the at least one heating unit passes a preset cooking time.

In addition, the determining of whether the cooking is completed includes determining whether the first input unit is operated to be off.

When it is determined that the cooking is completed, the cooking apparatus stops the heating unit which is currently operated and outputs cooking completion information.

Here, the outputting of the cooking completion information includes displaying the cooking completion information on the display unit 120 of the cooking apparatus.

In addition, the outputting of the cooking completion information includes displaying the cooking completion information on the display unit provided in the external device 2 performing communication with the cooking apparatus.

Hereinafter, the control of the operation of the range assembly of the cooking apparatus will be described based on the cooking information.

The cooking apparatus determines cooking information input to the input unit 110 or cooking information received by the communication unit 163.

The cooking apparatus determines the output level per cooking time unit based on the determined cooking information.

That is, the cooking apparatus sequentially determines a target temperature corresponding to the output level during a total cooking time during which food is cooked and a duration time of each target temperature.

When the cooking vessel is placed on the support and the first input unit 111 is manipulated, the cooking apparatus may enable gas to be supplied through the venturi 153*a* and perform ignition, so that a flame may be generated in the first heating unit 150*a*.

Next, the cooking apparatus determines the heating level of the first heating unit and the heating level of the second heating unit each corresponding to the determined output level, and operates at least one of the first heating unit and the second heating unit based on the determined heating levels of the first and second heating units.

For example, the cooking apparatus may operate the second heating unit at a minimum level when the output level is 1, operate the first heating unit at a low level when the output level is 2, and operate the second heating unit at the minimum level and the first heating unit at the low level when the output level is 4.

The cooking apparatus detects the temperature of the bottom surface of the cooking vessel during the operation of the at least one heating unit of the range assembly, and determines whether the detected temperature is the target temperature.

When it is determined that the detected temperature is the target temperature, the cooking apparatus maintains the output level.

The cooking apparatus determines whether the output level is to be changed based on the duration time of the output level, determines the heating level of the first heating unit and the heating level of the second heating unit each corresponding to an output level to be changed when it is determined that the output level is to be changed, and adjusts the heating level of at least one of the first heating unit and the second heating unit based on the determined heating levels of the first and second heating units.

The cooking apparatus detects the temperature of the cooking vessel, compares the detected temperature with the target temperature of the changed output level, and maintains the output level when it is determined that the detected temperature is the target temperature.

The cooking apparatus determines whether cooking is completed.

Here, the determining of whether cooking is completed includes determining whether the operation time of the at least one heating unit passes the total cooking time.

When it is determined that the cooking is not completed, the cooking apparatus repeatedly performs a process of determining whether the output level is to be re-changed based on the duration time of the changed output level and adjusting the heating level of the at least one heating unit based on the output level to be re-changed when it is determined that the output level is to be re-changed.

When it is determined that the cooking is completed, the cooking apparatus stops the heating unit which is currently operated and outputs cooking completion information.

Here, the outputting of the cooking completion information includes displaying the cooking completion information on the display unit 120 of the cooking apparatus.

In addition, the outputting of the cooking completion information includes displaying the cooking completion information on the display unit provided in the external device 2 performing communication with the cooking apparatus.

Figure 17:
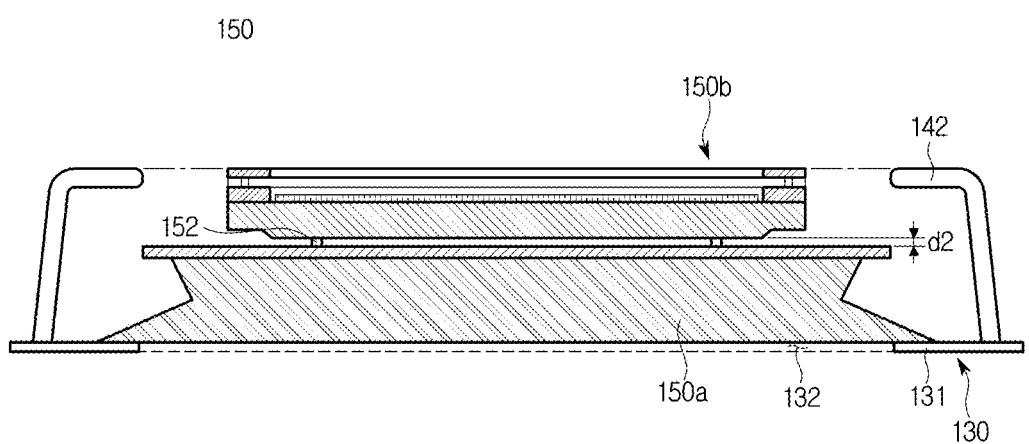
FIG. 17 illustrates a cooking apparatus in accordance with another embodiment of the present disclosure.

FIG. 17 illustrates a cooking apparatus in accordance with another embodiment of the present disclosure.

As illustrated in FIG. 17, the range assembly 150 includes a first heating unit 150*a* that generates heat using a first heat source, and a second heating unit 150*b* that is arranged to be spaced apart from the first heating unit by a predetermined distance d2 while being stacked on the first heating unit 150*a* so that an air flow passage may be formed between the first heating unit 150*a* and the second heating unit 150*b* and generates heat using a second heat source.

A support member 152 may be arranged between the first heating unit 150*a* and the second heating unit 150*b*.

The second heating unit 150*b* may be arranged with a gap of the predetermined distance d2 from the first heating unit 150*a* by the support member 152. Accordingly, it is possible to improve combustibility when the first heating unit is operated.

More specifically, the first heating unit 150*a* includes a venturi 153*a* through which gas is supplied, a first valve 153*b* that is provided at the venturi 153*a* to block gas supply, a second valve 153*c* that is provided at the venturi 153*a* to adjust the amount of gas supply to be high or low, a body 153*d* that is connected to the venturi 153*a*, a head 153*e* that is seated inside the body 153*d*, a cap 153*f* that is detachably mounted at an upper portion of the head 153*e*, and an ignition portion 153*h* that is operated by manipulation of a jog dial by a user.

Here, in the ignition portion, ignition may be automatically controlled.

The second heating unit 150*b* includes a heat generation unit 154*a* that generates heat using electrical energy, a housing 154*b* that receives the heat generation unit 154*a*, an insulation portion 154*c* that is arranged to be brought into contact with the housing 154*b* and prevents the heat of the heat generation unit 154*a* from being moved to the first heating unit 150a side, and a panel 154d that is made of tempered glass and protects the heat generation unit 154a from an external force.

In addition, the height of the stacked first and second heating units 150a and 150b may be the same as the height of the support leg 142 of the support.

Accordingly, when the cooking vessel is placed on the range assembly, the support leg 142 of the support and the top surface of the panel 154d of the second heating unit 150b may be brought into contact with the bottom surface of the cooking vessel.

A power line and communication line of the second heating unit of the cooking apparatus may be arranged inside a hole formed in the first heating unit, or connected in the outside.

The cooking apparatus may further include a driving module, and generate heat at the output levels of multiple stages by the driving module.

More specifically, referring to FIG. 1, when the first input unit is manipulated by a user, the driving module determines the heating level of the first heating unit 150a, adjusts the amount of gas supply based on the determined heating level of the first heating unit 150a, and controls the operation of the second heating unit 150b so that the heat may be reinforced.

The driving module may determine the manipulated first input unit, determine the range assembly matched with the determined first input unit, and control an identification number of the determined range assembly to be displayed. In addition, the driving module may control the operation of the second heating unit provided in the determined range assembly.

The driving module determines the output level input to the input unit 110, determines a heating level of the first heating unit and a heating level of the second heating unit each corresponding to the determined output level, and controls the operation of each of the first heating unit 150a and the second heating unit 150b.

The driving module determines a cooking time that has elapsed from a cooking start time, and controls output of overheating alarm information when it is determined that the determined cooking time passes a limit time.

As described above, according to the embodiments of the present invention, the output of each of the first heating unit and the second heating unit may be controlled at levels of multiple stages by detecting a temperature of a lower portion of the cooking vessel, and therefore food may be cooked at an optimum temperature, thereby improving the taste of the food resulting in improved user satisfaction.

In addition, according to the present disclosure, the first heating unit and the second heating unit may be operated together, so that it is possible to prevent emission of the heat of the second heating unit to the outside by the heat generated by the first heating unit, thereby reducing energy consumed in the second heating unit while increasing the heating rate.

In addition, according to the present disclosure, the first heating unit and the second heating unit may be operated together, so that heat is prevented from moving toward the second heating unit, thereby preventing heat loss of the first heating unit.

In addition, according to the present disclosure, the first heating unit and the second heating unit may be arranged to be spaced apart from each other so that a flow passage of air is formed, so that outside air may be supplied to the first heating unit, thereby improving the combustibility of gas.

In addition, according to the present disclosure, it is possible to prevent a sensed value of the temperature detection unit from increasing abruptly due to the flame of the first heating unit oriented towards the temperature detection unit.

In addition, according to the present disclosure, when a gas valve is shut off during the operation of the first heating unit, cooking may be completed using the second heating unit.

In addition, according to the present disclosure, when the detected temperature is a predetermined temperature or higher, the output of at least one of the first heating unit and the second heating unit may be controlled to be lowered, so that a safe state may be achieved, thereby improving the stability of the cooking apparatus.

In addition, according to the present disclosure, it is possible to automatically cook the food by adjusting the output levels of the first heating unit and the second heating unit based on cooking information received by the input unit or the communication unit, thereby improving user's convenience.

In addition, according to the present disclosure, a user may easily recognize a degree of cooking by providing cooking information to an external device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:
a first heater including a first hole and configured to heat a cooking vessel by burning a gas;
a second heater arranged to be stacked on the first heater, including a second hole formed at a position corresponding to the first hole, and configured to heat the cooking vessel by flowing a current;
a temperature detector arranged to protrude to the outside of the second hole while being arranged in the first hole of the first heater and the second hole of the second heater, and configured to detect a temperature of the cooking vessel when the cooking vessel is brought into contact with the temperature detector;
a storage configured to store output levels of multiple stages which are set by a combination of a heating level of the first heater and a heating level of the second heater;
an input device configured to receive one output level of the output levels of multiple stages; and
a controller configured to control the heating level of at least one of the first heater and the second heater based on the received output level.

2. The cooking apparatus according to claim 1, further comprising:
a communication module configured to communicate with an external device,
wherein the controller is configured to control the communication module such that operation information of each of the first heater and the second heater is transmitted to the external device, and control each of the heating level of the first heater and the heating level of the second heater based on cooking information received by the communication module.

3. The cooking apparatus according to claim 1, further comprising:
a communication module configured to communicate with an external device, wherein the controller is configured to control the communication module such that the detected temperature is transmitted to the external device.

4. The cooking apparatus according to claim 1, further comprising:
a display,
wherein the controller is configured to control output of alarm information of the display when the detected temperature is a limit temperature or higher.

5. The cooking apparatus according to claim 4, wherein the controller is configured to determine a cooking time during operation of at least one of the first heater and the second heater, and control output of alarm information of the display when the determined cooking time passes a limit time.

6. A cooking apparatus comprising:
a first heater including a first hole, and configured to heat by burning a gas;
a second heater arranged to be stacked on the first heater, including a second hole formed in a position corresponding to the first hole, and configured to generate heat for reinforcing the heat generated by the first heater while generating heat by flowing a current;
a temperature detector arranged to protrude to the outside of the second hole while being arranged in the first hole of the first heater and the second hole of the second heater, and configured to detect a temperature of a cooking vessel when the cooking vessel is brought into contact with the temperature detector;
an input device configured to receive an operation command of the first heater; and
a controller configured to control an operation of the second heater when the operation command of the first heater is received.

7. The cooking apparatus according to claim 6, wherein the temperature detector includes:
a sensing portion arranged to protrude to the outside of the second hole and configured to detect the temperature of the cooking vessel,
a guidance portion connected to the sensing portion, accommodate a signal line of the sensing portion and a communication line and a power line of the second heater, and movably arranged inside the first hole and the second hole, and
an elastic member arranged to elastically support the guidance portion.

8. The cooking apparatus according to claim 6, further comprising:
a display configured to display the temperature of the cooking vessel.

9. The cooking apparatus according to claim 6, wherein, when a menu is input to the input device, the controller is configured to control one of an output level, a cooking time, and energy consumption corresponding to the input menu to be output as recommendation information.

10. The cooking apparatus according to claim 6, wherein the controller is configured to adjust a heating level of the second heater when constant temperature control is required during cooking.

* * * * *